US011041949B2

(12) United States Patent
Lomnitz et al.

(10) Patent No.: US 11,041,949 B2
(45) Date of Patent: *Jun. 22, 2021

(54) SYSTEM, DEVICE AND METHODS FOR LOCALIZATION AND ORIENTATION OF A RADIO FREQUENCY ANTENNA ARRAY

(71) Applicant: VAYYAR IMAGING LTD, Yehud (IL)

(72) Inventors: Yuval Lomnitz, Herzlia (IL); Damian Hoffman, Zur Yizhak (IL); Shachar Shayovitz, Ness Ziona (IL)

(73) Assignee: VAYYAR IMAGING LTD, Yehud (IL)

( * ) Notice: Subject to any disclaimer, the term of this patent is extended or adjusted under 35 U.S.C. 154(b) by 98 days.

This patent is subject to a terminal disclaimer.

(21) Appl. No.: 16/273,590

(22) Filed: Feb. 12, 2019

(65) Prior Publication Data
US 2019/0227161 A1 Jul. 25, 2019

Related U.S. Application Data

(63) Continuation of application No. 15/569,836, filed as application No. PCT/IL2016/050448 on May 1, 2016, now Pat. No. 10,288,728.
(Continued)

(51) Int. Cl.
G01S 13/90 (2006.01)
G01S 13/02 (2006.01)
(Continued)

(52) U.S. Cl.
CPC ...... *G01S 13/9005* (2013.01); *G01S 13/0209* (2013.01); *G01S 13/50* (2013.01);
(Continued)

(58) Field of Classification Search
CPC .. G01S 13/90; G01S 13/9005; G01S 13/9029; G01S 13/9035; G01S 13/9094;
(Continued)

(56) References Cited

U.S. PATENT DOCUMENTS 2,735,070 A 2/1956 Riblet
4,010,715 A 3/1977 Robar et al.
(Continued)

FOREIGN PATENT DOCUMENTS

EP 1845364 A2 10/2007
WO 2014/080360 A2 5/2014

OTHER PUBLICATIONS

Pailhas et al, Yan, "Synthetic Aperture Imaging and Autofocus With Coherent MIMO Sonar Systems", http://osl.eps.bw.ac.uk/files/uploads/publications/SASSARconf Pailhas.pdf (2014).
(Continued)

*Primary Examiner* — Peter M Bythrow
(74) *Attorney, Agent, or Firm* — Browdy and Neimark, PLLC

(57) ABSTRACT

The methods and device disclosed herein provide an array such as a Radio Frequency (FR) antenna array for measuring the array movement or displacement of the array relative to a reference location. In some cases the array may be attached to or in communication with the device. The array comprises at least two transducers (e.g. RF antennas), wherein at least one of the at least two transducers is configured to transmit a signal towards the object, and at least one transceiver attached to said at least two transducers, the at least one transceiver is configured to repetitively transmit at least one signal toward an object and receive a plurality of signals affected or reflected while the array is moved in proximity to the object/medium or scene; and at least one processor unit, configured to: process the affected signals to yield a plurality of signal measurements and compare said signal measurements obtained at different locations over time of said second object and calculate a movement of the object relative to a reference location.

28 Claims, 14 Drawing Sheets

Related U.S. Application Data

(60) Provisional application No. 62/154,375, filed on Apr. 29, 2015.

(51) Int. Cl.
  *G01S 13/50* (2006.01)
  *G01S 13/88* (2006.01)
  *G01S 13/89* (2006.01)
  *H01Q 3/34* (2006.01)

(52) U.S. Cl.
  CPC ............ *G01S 13/885* (2013.01); *G01S 13/89* (2013.01); *G01S 13/904* (2019.05); *G01S 13/9029* (2013.01); *H01Q 3/34* (2013.01)

(58) Field of Classification Search
  CPC .... G01S 13/0209; G01S 13/50; G01S 13/885; G01S 13/89; G01S 13/931
  See application file for complete search history.

(56) References Cited

U.S. PATENT DOCUMENTS

| | | | |
|---|---|---|---|
| 4,211,224 A | 7/1980 | Kubach | |
| 4,211,911 A | 7/1980 | Dehn | |
| 4,626,805 A | 12/1986 | Jones | |
| 4,991,585 A * | 2/1991 | Mawhinney | A61B 5/0507 340/573.1 |
| 5,039,824 A | 8/1991 | Takashima | |
| 5,101,163 A | 3/1992 | Agar | |
| 5,389,735 A | 2/1995 | Bockelman | |
| 5,572,160 A | 11/1996 | Wadell | |
| 5,573,012 A * | 11/1996 | McEwan | A61B 5/024 600/428 |
| 5,583,510 A | 12/1996 | Ponnapalli | |
| 5,718,208 A | 2/1998 | Brautigan | |
| 5,774,801 A | 6/1998 | Li et al. | |
| 5,829,522 A | 11/1998 | Ross | |
| 6,400,306 B1 * | 6/2002 | Nohara | G01S 13/5244 342/160 |
| 6,636,816 B1 | 10/2003 | Dvorak et al. | |
| 7,034,548 B2 | 4/2006 | Anderson et al. | |
| 7,148,702 B2 | 12/2006 | Wong et al. | |
| 7,387,010 B2 | 6/2008 | Sunshine | |
| 7,448,880 B2 | 11/2008 | Osaka | |
| 7,668,046 B2 * | 2/2010 | Banker | G06F 3/0346 367/127 |
| 7,755,010 B2 | 7/2010 | Godshalk | |
| 8,050,740 B2 | 11/2011 | Davis | |
| 8,095,204 B2 | 1/2012 | Smith | |
| 8,494,615 B2 | 7/2013 | Melamed et al. | |
| 8,620,238 B2 | 12/2013 | Chan et al. | |
| 10,288,728 B2 * | 5/2019 | Lomnitz | G01S 13/0209 |
| 2002/0165295 A1 | 11/2002 | Matsumoto | |
| 2003/0146767 A1 | 8/2003 | Steele | |
| 2004/0015087 A1 * | 1/2004 | Boric-Lubecke | A61B 5/0507 600/509 |
| 2004/0077943 A1 | 4/2004 | Meaney | |
| 2004/0190377 A1 | 9/2004 | Lewandowski | |
| 2005/0040832 A1 | 2/2005 | Steele et al. | |
| 2005/0255276 A1 | 11/2005 | Bethune | |
| 2006/0176062 A1 | 8/2006 | Yang et al. | |
| 2006/0220658 A1 | 10/2006 | Okamura | |
| 2007/0150194 A1 | 6/2007 | Gleb | |
| 2007/0205937 A1 * | 9/2007 | Thompson | G01S 13/89 342/22 |
| 2008/0077015 A1 * | 3/2008 | Boric-Lubecke | A61B 5/0507 600/453 |
| 2008/0296306 A1 | 12/2008 | Handa | |
| 2009/0227882 A1 * | 9/2009 | Foo | G01S 13/0209 600/508 |
| 2010/0152600 A1 * | 6/2010 | Droitcour | A61B 5/1114 600/534 |
| 2011/0060215 A1 | 3/2011 | Tupin | |
| 2011/0068807 A1 | 3/2011 | Kesil et al. | |
| 2011/0134001 A1 | 6/2011 | Sakata | |
| 2011/0202277 A1 * | 8/2011 | Haddad | G01S 13/885 702/7 |
| 2011/0237939 A1 * | 9/2011 | Melamed | G06T 5/50 600/425 |
| 2011/0238339 A1 | 9/2011 | Fericean et al. | |
| 2012/0022348 A1 * | 1/2012 | Droitcour | G01S 13/825 600/323 |
| 2012/0242341 A1 | 9/2012 | Olsson | |
| 2012/0327666 A1 | 12/2012 | Liu | |
| 2013/0113647 A1 * | 5/2013 | Sentelle | G01S 13/887 342/22 |
| 2013/0141287 A1 | 6/2013 | Pallonen | |
| 2013/0231046 A1 | 9/2013 | Pope | |
| 2013/0241780 A1 | 9/2013 | Amm et al. | |
| 2013/0271328 A1 | 10/2013 | Nickel | |
| 2013/0300573 A1 | 11/2013 | Brown | |
| 2013/0329139 A1 | 12/2013 | Feher | |
| 2014/0066757 A1 | 3/2014 | Chayat | |
| 2014/0121964 A1 * | 5/2014 | Stanley | G01C 21/30 701/514 |
| 2014/0179239 A1 | 6/2014 | Nickel | |
| 2014/0276031 A1 * | 9/2014 | Lomnitz | A61B 5/4312 600/430 |
| 2014/0376821 A1 * | 12/2014 | Meir | G01S 13/89 382/218 |
| 2015/0078642 A1 * | 3/2015 | Fang | G06T 15/00 382/131 |
| 2015/0102956 A1 * | 4/2015 | Miles | G01S 13/89 342/73 |
| 2016/0288799 A1 * | 10/2016 | Nguyen Van | G01S 7/40 |
| 2016/0336643 A1 | 11/2016 | Pascolini | |

OTHER PUBLICATIONS

Fineup, J., "Synthetic-aperture radar autofocus by maximizing sharpness", http://www.opties_rochester.edu/workgroups/fineup/Publications/OL00_SARFocMaxSharp.pdf (2000).

Bates, James Stewart, "Expansions and Discussions of the Phase Gradient Algorithm", http://digitalcommons.usu.edu/cgi/viewcontent.cgi?article=1320&context=spacegrant (1998).

R. Streich et al., "Accurate imaging of multicomponent GPR data based on exact radiation patterns," IEEE Transactions on Geoscience and Remote Sensing, vol. 45, 93-103 (2007).

Crocco L et al: "Early-stage leaking 1-13 pipes GPR monitoring via microwave A tomographic inversion" Journal of Applied Geophysics. Elsevier. Amsterdam. NL. vol. 67. No. 4. Apr. 1, 2009 (Apr. 1, 2009). pp. 270-277. XP026033856.

Ayliffe et al., 'Electric Impedance Spectroscopy' Using Microchannels with Integrated Metal Electrodes' IEEE Journal of Microelectromechanical Systems, vol. 8, No. 1, Mar. 1999.

P. Lombardini et al., "Criteria for the Design of Loop-Type 12 Directional Couplers for the L Band" (1956).

Pallavi R. Malamel et al., "Microwave Reflectometry Based Electrical Characterization of Milk for Adulteration Detection", Advance in Electronic and Electric Engineering, ISSN 2231-1297, vol. 4, No. 5 (2014), pp. 487-492.

Valerie Favry, "Design and Development of a Novel Electronic Sensor for Detecting Mastitis Based on Conductance/Impedance Measurements", Thesis submitted for the Degree o f Master o f Science,Supervised by Prof. Dermot Diamond School o f Chemical Sciences, National centre for Sensor Research.

Ali F. Yegulap et al., "Minimum Entropy SAR Autofocus", http://www.ll.mit.edu/asap/asap_99/abstract/Yegulap.pdf (1999).

David Atkins et al., "Motion Correction", ISMRM 2011 Montreal Sunrise Course: Image Reconstruction (2011).

* cited by examiner

Scanning along one dimension

Alternating direction between 2 dimensions

SYSTEM, DEVICE AND METHODS FOR LOCALIZATION AND ORIENTATION OF A RADIO FREQUENCY ANTENNA ARRAY

CROSS-REFERENCE

The present application claims the benefit of U.S. Provisional Application Ser. No. 62/154,375, filed on Apr. 29, 2015, entitled "SYSTEM, DEVICE AND METHOD FOR LOCALIZATION AND ORIENTATION OF ANTENNA ARRAY FOR RADIO FREQUENCY IMAGING", the entire disclosures of which are incorporated herein by reference. The subject matter of the present application is related to PCT Application PCT/IL2015/050126, filed Feb. 4, 2015, entitled "SYSTEM DEVISE AND METHOD FOR TESTING AN OBJECT", PCT Application PCT/IL2015/050099, filed on Jan. 28, 2015, entitled "SENSORS FOR A PORTABLE DEVICE", U.S. application Ser. No. 14/605,084, filed on Jan. 26, 2015 entitled "VECTOR NETWORK ANALYZER" U.S. application Ser. No. 14/499,505, filed on Sep. 30, 2015 entitled "DEVICE AND METHOD FOR CALIBRATING ANTENNA ARRAY SYSTEMS" U.S. application Ser. No. 14/69681, filed on Apr. 27, 2015 entitled "PRINTED ANTENNA HAVING NON-UNIFORM LAYERS" each of which is incorporated herein by reference in its entirety.

INCORPORATION BY REFERENCE

All publications, patents, and patent applications mentioned in this specification are herein incorporated by reference to the same extent as if each individual publication, patent, or patent application was specifically and individually indicated to be incorporated by reference.

FIELD OF THE INVENTION

The present invention relates to a sensing system, device and methods for sensing an object or substances and more specifically, but not exclusively, to relative localization and orientation of an antenna array for Radio Frequency (RF) sensing or imaging.

BACKGROUND OF THE INVENTION

Prior to the background of the invention being set forth, it may be helpful to set forth definitions of certain terms that will be used hereinafter.

The term 'location information' or 'movement information' of an object or device as used herein is defined as a movement or displacement of an object relative to a reference location or displacement trajectory x(t) of said object or device.

The term 'RF image' as used herein is defined as an image constructed based on RF signals affected by or reflected from an imaged or scanned object, medium or scene.

Basic distance and direction tracking and measurement systems are well known in the art. These systems relate to measuring the distance of an object or device relative to a reference point or position. The tracking and measurement systems may be utilized to measure the distance movement and/or direction of the object to identify which locations the object has past. For example a surveyor's wheel, also called trundle wheel, measuring wheel or perambulator is a device used for measuring distance.

In respect to imaging and scanning procedures of scanning or sensing devices there is a need to track the distance and direction of a device relative to reference point such as an imaging or scanning device to obtain the distance or an image of a scanned object.

For accurate coherent radar imaging, the location of each antenna in an antenna array has to be known with accuracy of a wavelength of at least $\lambda/10$ where $\lambda$ is the typical signal wavelength. Accurate location is important either for synthetic aperture imaging, where the antenna array is moved during imaging, or in order to merge multiple single-snapshot images into a single image of the scanned scene.

Current SAR systems use IMS (Inertial Measurements Systems) to estimate the displacement between measurements, and usually use a data driven auto focus algorithm to correct errors in the SAR measurements.

In SAR imaging, commonly applied from aircrafts, improving the accuracy of location of the antenna sensors at the time point where the measurement was taken is an important matter. The prior art solutions that are currently used to overcome such problems, rely on autofocusing of the resulting image.

Examples of commercially used autofocusing methods and additional details regarding the principle of operation of autofocusing as herein described may be found on the Internet, for example, at: http://osl.eps.hw.ac.uk/files/uploads/publications/SASSARconf_Pailhas.pdf an article by Yan Pailhas and Yvan Petillot entitled "Synthetic Aperture Imaging and Autofocus with Coherent MIMO Sonar Systems".

Yan Pailhas and Yvan Petillot propose two MIMO autofocus techniques to estimate with great accuracy mid-water target depth, speed and orientation. All the MIMO data in their paper are computed using a foil 3D realistic MIMO simulator including multipath, seabed physical models and cloud point model to compute time echoes. For the simulations the MIMO system has a central frequency of 30 kHz. It is composed of 11 transmitters (Tx) and 11 receivers (Rx) in a "L" shape configuration. The seabed elevation is simulated using fractional Brownian motion model. Simulations were ran with a sandy mud seabed type.

Another autofocus techniques may be found on the Internet, for example, at: http://www.ll.mit.edu/asap/asap_99/abstract/Yegulap.pdf entitled "Minimum Entropy SAR Autofocus", and http://www.optics.rochester.edu/workgroups/fienup/PUBLICATIONS/OL00_SARFoc MaxSharp.pdf by entitled "Synthetic-aperture radar autofocus by maximizing sharpness" by J. R. Fienup.

Fienup suggest to focus a synthetic-aperture radar image that is suffering from phase errors, a phase-error estimate is found that, when it is applied, maximizes the sharpness of the image. Closed-form expressions are derived for the gradients of a sharpness metric with respect to phase-error parameters, including both a point-by-point (nonparametric) phase function and coefficients of a polynomial expansion. Use of these expressions allows for a highly efficient gradient-search algorithm for high-order phase errors.

Another solution according to the prior art includes PGA (phase gradient autofocus), which utilizes the measurements in a more direct fashion. Examples of commercially used PGA methods and additional details regarding the principle of operation of PGA as herein described may be found on the internet, for example, at http://digitalcommons.usu.edu/cgi/viewcontent.cgi?article=1320&context=spacegrant entitled "Expansions and Discussions of the Phase Gradient Algorithm", and https://ecopyright.ieee.org/xplore/ie-notice.html entitled "Phase gradient autofocus-a robust tool for high resolution SAR phase correction").

A similar method is to use autofocus algorithms to estimate and correct the target velocity, for example may be found on the Interact, for example, at ([Pailhas and Petillot] "Synthetic Aperture Imaging and Autofocus with Coherent MIMO Sonar Systems", [Atkinson 2013] "Retrospective Motion Correction").

The prior measuring devices and methods can be less than ideal in at least some respects. The main disadvantage of applying auto-focus or target-tracking algorithms to find an antenna array location, as disclosed by the prior art solutions, is that if the resolution of imaging which is obtained from signals recorded at a single location of the array is poor, then there is inherent ambiguity between the target location and the array location, where "target" here can be any reflector the imaging algorithm may detect. Errors in the localization of targets may cause auto-focus algorithms to deviate in the estimation of location of the array or the target, such that these targets will be amplified at the expense of other targets.

SUMMARY OF INVENTION

According to a first aspect of the invention there is provided a device for measuring a movement of the device relative to a reference location, the device comprising: an array, the array comprises at least two transducers, wherein at least one of said at least two transducers is configured to transmit a signal towards an object, and at least one transceiver attached to said at least two transducers, the at least one transceiver is configured to repetitively transmit at least one signal toward the object and receive a plurality of signals affected by the object while the array is moved in proximity to the object; a data, acquisition unit configured to receive and store said plurality of affected signals; and at least one processor unit, said at least one processor unit is configured to: process said affected signals to yield a plurality of signal measurements and compare said signal measurements obtained at different locations over time of said device and calculate a movement of the device relative to a reference location.

In an embodiment, the comparing signal measurements further comprises comparing a first set of signal measurements of said plurality of signal measurements received by a first couple of transducers of said array to a second set of signal measurement of said plurality of signal measurements received by a second couple of transducers of said array and retrieve said device movement distance on said object in respect to the reference location.

In an embodiment, the movement comprises displacement trajectory $x(t)$ or $x(t),y(t)$ of said device with respect to said object.

In an embodiment, the plurality of signal measurements comprise a plurality of transfer functions of said array.

In an embodiment, each of the plurality of transfer functions comprise said object response between two transducers of said at least two transducers as function of frequency or time and wherein the at least one processor unit is configured to estimate said device movement trajectory $x(t)$ or $x(t),y(t)$ relative to the first reference location of said device.

In an embodiment, the estimation comprises:
(a) finding a plurality of displacements delta ($\Delta=(\Delta_x,\Delta_y)$) of said device such that there exist two ordered sets of transducers pairs in the array, a first set of transducers pairs (L) and a second set of transducers pairs (R), such that all transducers pairs in said first set of transducers pairs are shifted by one of said plurality of displacements delta ($\Delta$) compared to a respective transducers pairs in said second set of transducers pairs;
(b) comparing transfer functions taken at each location at said object to transfer functions taken at other locations using a comparison metric and producing one or more comparison matrices $D_\Delta(T_1,T_2)$ wherein each snapshot of recorded signals is compared to each other snapshot.
(c) calculate log-likelihood functions for each displacement over a plurality of combinations of $T_1,T_2,\Delta$, wherein the log-likelihood is the distance $x(T_1)-x(T_2)$ between the measurements taken at times $T_1,T_2$ is $\Delta+d$ is determined as function of $D_\Delta(T_1,T_2)$.
(d) calculate a log-likelihood of each trajectory using a movement model.

In an embodiment, the device comprising combining side information from an accelerometer, the accelerometer is in communication with said array.

In an embodiment, the device comprising calculating the displacement trajectory $x(t)$, or $x(t)$ and $y(t)$ in two dimensions from the set of at least one matrix. $D_\Delta(T_1,T_2)$.

In an embodiment, the estimating the movement trajectory of said device further comprises estimating a two dimensional location $x(t),y(t)$ and array rotation $\theta(t)$.

In an embodiment, the device comprises providing an interpolator said interpolator is configured to estimate from a first plurality of recorded transfer functions a second plurality of transfer functions, that would be obtained had the displacement and rotation changed by $\Delta X, \Delta Y, \Delta \theta$.

In an embodiment, the device comprising:
(a) providing an estimator for shift between measurement, said estimator is configured to compare a first set of transfer functions of said transfer functions recorded at a current snapshot, to a second set of transfer functions of said transfer functions recorded at a previous snapshot, after interpolating by the change $\Delta X, \Delta Y, \Delta \theta$, and finding the displacement and rotation $\Delta X, \Delta Y, \Delta \theta$ for which best fit of the first set of transfer functions and the second set of transfer functions is obtained; and
(b) providing an integrator configured to integrate the changes $\Delta X, \Delta Y, \Delta \theta$ from snapshot to snapshot to obtain a complete trajectory $x(t),y(t)\theta(t)$.

In an embodiment, for each of the plurality of displacements delta ($\Delta$) a matrix $D_\Delta(T_1,T_2)$ is provided, said matrix comprising for each pair of said snapshots (T1,T2) a comparison result: $D_\Delta(T_1,T_2)=\mu(\{S_{ij}(T_1),S_{i'j'}(T_2)\}_{(i,j)\in L^{(\Delta)},(i',j')\in R^{(\Delta)}})$, where $\mu$ is a metric.

In an embodiment, the metric $\mu$ is:

$$\mu = \sum_{(i,j)\in L^{(\Delta)},(i',j')\in R^{(\Delta)}} \frac{\|S_{ij}(T_1) - S_{i'j'}(T_2)\|^2}{P_{ij} + P_{i'j'}}$$

where $\|S\|^2$ is L2 norm sum of squares over frequency or time domain of the signal, and $P_{ij}$ are powers of the signals, either estimated or known apriori.

In an embodiment, the said log-likelihood function for the displacement in step c is:

$$L(d = x(T_1) - x(T_2) - \Delta) = \left(\log(1-\rho^2) - \frac{2\rho}{1+\rho}\right) + \frac{\rho}{(1-\rho^2)}D_\Delta(T_1,T_2)$$

where $$\rho(d) = \rho_{max} \cdot \exp\left(-\left(\frac{d}{L_{coh}}\right)^2\right)$$

is an assumed spatial correlation function with parameters $\rho_{max}$ (maximum correlation) and $L_{coh}$ (coherence length).

In an embodiment, the array is a radio frequency (RF) antenna array and said at least two transducers are RF antennas.

According to a second aspect of the invention there is provided a device for measuring a movement of the device relative to a reference location, the device comprising: at least one imager the imager is configured to continuously image a plurality of images of air object from a constant distance; a data acquisition unit configured to store said plurality of images and attach an index or a time stamp to each image of said plurality of images; at least one processor unit, said at least one processing unit is configured to enhance said plurality of images and compare at least two sets of images of said plurality of images to yield an incremental displacement $\Delta X, \Delta Y$ and rotation $\Delta\theta$ between the at least two sets of images and calculate a movement of the object relative to a reference location In an embodiment, the image enhancement comprises de-trending and compensation for differences in lightning in various part of each of said plurality of images.

In an embodiment, the at least two sets of images are consecutive snapshots images.

In an embodiment, the plurality of images are high-pass filtered and cross-correlated in order to yield a shift and rotation between each image of said plurality of images.

In an embodiment, the first set of images are shifted and interpolated to represent a shift of $\Delta X, \Delta Y$ and a rotation $\Delta\theta$, and compared to the second set of images by summing a product of each pixel in each image of the first set of images after shifting and the respective pixel second image to obtain a single number, and providing a cross-correlation function by repeating the computation above for each $\Delta X, \Delta Y$ and a rotation $\Delta\theta$ generates the cross-correlation function and finding for each snapshot incremental displacement $\Delta X, \Delta Y$ and rotation $\Delta\theta$ that maximize said cross-correlation function.

In an embodiment, the device further comprising providing an integrator, said integrator is configured to integrate the changes $\Delta X, \Delta Y, \Delta\theta$ from snapshot to snapshot to obtain the full trajectory $x(t), y(t)\theta(t)$.

In an embodiment, the device comprising calibrating the resulting displacements $x(t), y(t)$ by multiplying by a factor that corrects the relation between the scaling of the plurality of images and actual displacements.

In an embodiment, the imager is a camera.

In an embodiment, the device is a mobile phone and said camera is a camera of said mobile phone.

In an embodiment, the device comprising a light source to compensate for external lighting conditions.

In an embodiment, wherein the array is attached to said device, the array comprises at least two transducers, wherein at least one of said at least two transducers is configured to transmit a signal towards said object, and at least one transceiver attached to said at least two transducers, the at least one transceiver is configured to repetitively transmit at least one signal toward the object and receive a plurality of signal s affected by object while the array is moved in proximity to the scanned object, and wherein the at least one processor unit is configured to process said affected signals and incremental displacement $\Delta X, \Delta Y$ and rotation $\Delta\theta$ of the device and provide an RF image of said object.

In an embodiment, the RF image comprises at least one image of internal elements of said object.

In an embodiment, the RF image is a 2D (two dimension) or 3D (three dimension) image.

According to a third aspect of the invention there is provided a device for measuring a displacement distance of the device, the device comprising: an array, the array comprises at least two transducers, wherein at least one of said at least two transducers is configured to transmit a signal towards an object or scene, and at least one transceiver attached to said at least two transducers, the at least one transceiver is configured to repetitively transmit at least one signal toward the object or scene and receive a plurality of signals affected by scene while the array is moved in proximity to the object; a data acquisition unit configured to receive and store said plurality of affected signals; and at least one processor unit, said at least one processor unit is configured to: process said affected signals to yield a plurality of signal measurements and compare said signal measurements obtained at different locations over time of said device according to a comparison model or interpolation model and calculate a movement of the device relative to a reference location.

In an embodiment, the device comprising providing according to said processed affected signals an RF image of said scanned object.

In an embodiment, the object comprises inner elements.

In an embodiment, the device comprising an imager, said imager is configured to provide a plurality of images of said scanned object.

In an embodiment, the imager is a camera.

In an embodiment, the device is a mobile phone and said camera is said mobile phone camera.

In an embodiment, the movement of the device is obtained by a merger of said plurality of images and said affected signals.

In an embodiment, the device comprising providing an image of a specific area of the scene or object, once the device is in proximity to a specific area at said object or scene, based on estimated said movement of the device.

In an embodiment, the transducers are antennas.

In an embodiment, the array is a Radio Frequency (RF) array and the at least two transducers are RF antennas configured to transmit an RF signal.

In an embodiment, the plurality of signals are radio frequency (RF) signals.

In an embodiment, the plurality signals are selected from the group comprising of: pulses signals, stepped/swept frequency signals.

In an embodiment, the plurality of signals bandwidth is within the UWB (3-10 Ghz) range or signals in the range between 1 Ghz and 100 Ghz.

According to a forth aspect of the invention there is provided a method for measuring a movement of a device relative to a reference location, the device comprising an antenna array, the antenna array comprising a plurality of antenna couples, the method comprising: moving the device, on an area of a scene; obtaining by the antenna array a plurality of RF signals affected by the scene; processing said plurality affected RF signals according to a comparison model or interpolation model to yield the distance or direction of the antenna array on scene relative to a reference location.

In an embodiment, the method comprising providing an RF image of the scene.

In an embodiment, the method comprising providing an RF image of a specific area of the scene once the antenna array is in proximity to the specific area.

In an embodiment, the method composing providing an image of the specific area of the scene once the antenna array is in front of the specific area.

Unless otherwise defined, all technical and/or scientific terms used herein have the same meaning as commonly understood by one of ordinary skill in the art to which the invention pertains. Although methods and materials similar or equivalent to those described herein can be used in she practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks, according to embodiments of the invention, could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein, are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The subject matter disclosed may best be understood by reference to the following detailed description when read with the accompanying drawings in which.

DETAILED DESCRIPTION

Figure 1A:
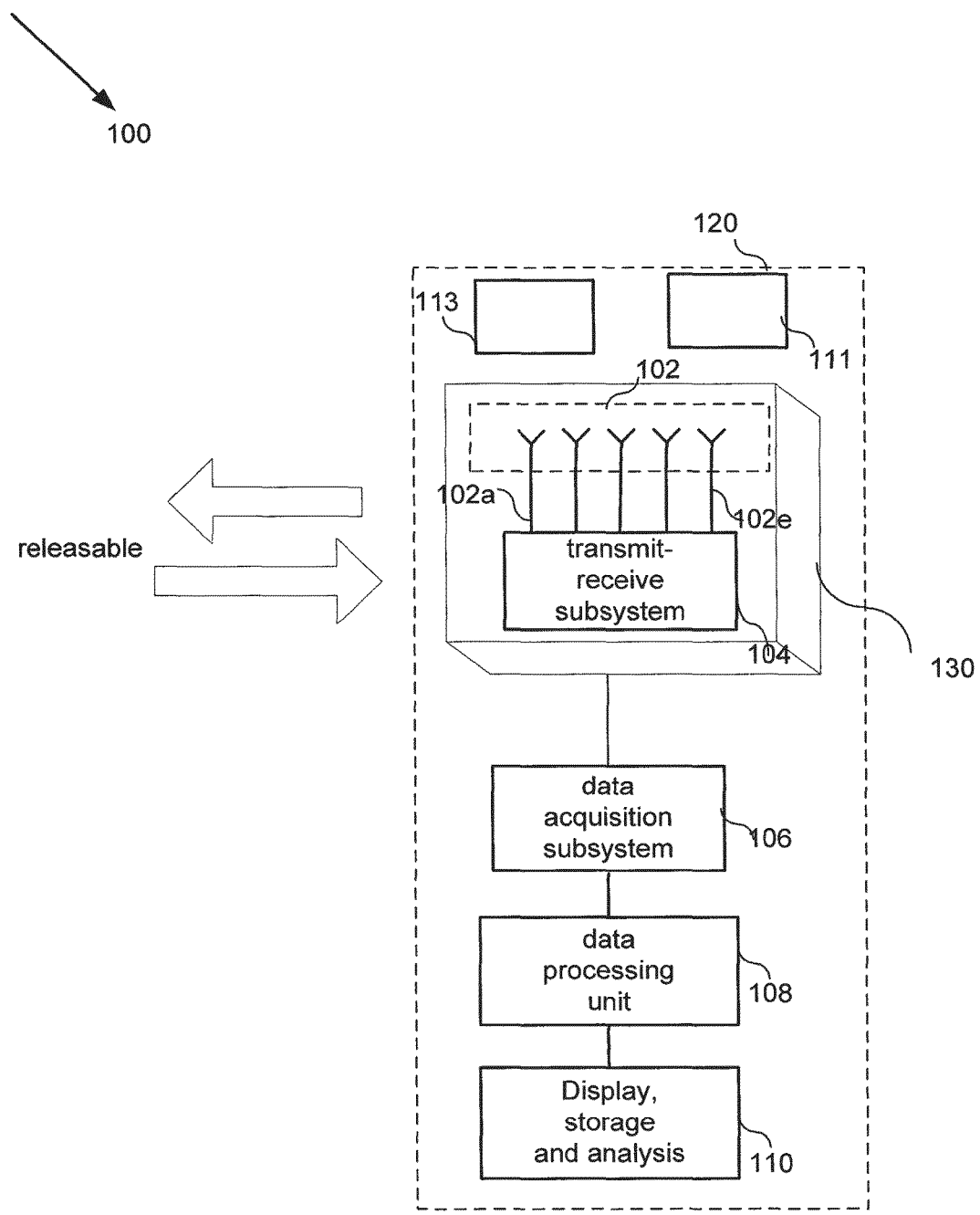
FIG. 1A is a schematic view of a sensing system, in accordance with embodiments of the invention.

The present invention relates to a sensing System device and method for sensing an object, medium or substances and specifically, but not exclusively, to relative localization and/or orientation of antenna array for Radio Frequency (RF) sensing for example imaging in an UWB (ultra-wideband) frequency range.

More specifically, the present invention embodiments provide methods, system and a device for accurately locating and/or measuring a movement of a device or system comprising an antenna array relative to a reference location without introducing costly sensors such as gyroscopes or integrated GPS or IMS (inertial measurements systems) systems.

According to one embodiment of the invention there is provided a device for measuring a movement of the device relative to a reference location, comprising: an array, which may be attached to the device. The array comprises at least two transducers (e.g. RF antennas), wherein at least one of the at least two transducers is configured to transmit a signal towards the object, and at least one transceiver attached to said at least two transducers, the at least one transceiver is configured to repetitively transmit at least one signal toward the object and receive a plurality of signals affected or reflected while the array is moved in proximity to an object (e.g. scanned object or medium or scene); a data acquisition unit configured to receive and store said plurality of affected signals; and at least one processor unit, configured to: process the affected signals to yield a plurality of signal measurements and compare said signal measurements obtained at different locations over time of said second object and calculate a movement of the object relative to a reference location.

According to another embodiment of the invention there is provided a sensing system or device such as an RF imaging device comprising an RF antenna array, such as two dimension or three dimension antenna array comprising two or more RF antennas. The RF imaging system may be utilized for imaging through targets or objects such as through-wall imaging. The device comprises or may be in communication with a processing unit which may process RF signals transmitted and received by the antenna array to identify the distance or location movement of the device relative to a reference point.

The present invention further provides a system and method for analyzing or characterizing an object for example according to impedance measures or dielectric properties of said object or substances using one or more sensors.

According to some embodiments of the invention there are provided methods and systems for estimating media parameters, namely the media's propagation velocity, attenuation and dispersion, for an unknown media (e.g. where the media and/or the objects within the media parameters are unknown) for example, in soil, concrete walls, hollow concrete "blocks", human body (such as breast cancer detection), etc.

According to another embodiment of the invention there is provided a system for sensing at least one substance or a medium comprising an array of sensors. In an embodiment, the array comprises one or more transducers for example at least two transducers, wherein at least one of the transducers is configured to transmit a signal towards the medium or the object, and at least one transceiver attached to the transducers, the transceiver is configured to transmit at least one signal toward the medium and receive a plurality of signals affected by the medium In an embodiment, the array of sensors comprises one or more antennas for example one or more receivers antennas and transmitters antennas or one or more microwave transceivers configured to transmit and receive one or more signals, to sense or image the substance and or medium from one or more locations. Measurements from multiple locations may be obtained by moving the antenna array, for example scanning along the medium surface, or by moving the medium.

It is stressed that the use of the term "sensing" refers to characterization of the media parameters. The term "imaging" refers to identification of structures or targets inside the medium.

In some embodiments the sensing unit (for sensing media parameters) is combined with an imaging unit (i.e. imager) for imaging the structures within the media. The two units may be combined in several ways. For example, the estimated media parameters may be used as prior information for the imaging algorithm (as will be illustrated herein below). Additionally, the media parameters may be used as additional information on the image (e.g. coloring different materials by different colors). Lastly, according to embodiments of the invention by using auto-focusing algorithms on the image, the estimation of the media parameters may be improved.

In some embodiments, the sensing system may include MIMO (multiple-input and multiple-output) arrays in the microwave region.

The system further includes a transmit/receive subsystem configured to generate and transmit the RF signals. For example these signals may be microwave signals in the UWB band 3-10 Ghz (having a wavelength of 3-10 cm in air), and may be stepped-CW (sinus), chirps, shaped/coded pulses or other waveforms, a Radio Frequency Signals Measurement Unit (RFSMU) such as a Vector Network Analyzer (VNA) for measuring the received/reflected signals, a data acquisition subsystem and one or more processor units for processing the measured signals and characterizing the medium.

In operation, one or more signals, such as a predesigned signal axe transmitted from one or more of the microwave transceiver antennas of the antenna array and are later received by one or more other antennas. The use of a wide frequency range such as UWB range (3-10 Ghz) allows high temporal resolution. In some cases, the signals utilized for microwave imaging or sensing applications, may be frequency-swept waveforms and/or pulse waveforms.

At the next step the received transmissions are used to estimate a transfer function of the medium located between the transmit antennas and receive antennas. A processing unit processes these signals to generate an estimate of location and in addition may generate an image of the medium. In some cases, the image may comprise of an intensity value per, for example 3D voxel, representing the strength of reflection obtained from the respective point in space.

The image reconstruction process includes analyzing a collection of responses yij(t) denoting the impulse response between one or more transducers, e.g., antenna i and antenna j at time t. The responses may be given, for example in frequency domain and converted to time domain by for example Inverse fast Fourier transform (IFFT) algorithm, or by other various algorithms as known to those skilled in the art.

In some cases, the estimation of the transfer functions yij(t) includes a calibration processes as known to those skilled in the art, for example, dividing the frequency domain signal Yij(f) by a reference signal Rij(f) representing for example the responses of the measurement device, traces, antenna elements and so forth.

Examples for embodiments for calibration an antenna array may be found in U.S. patent application Ser. No. 14/499,505, filed on Sep. 30, 2015 entitled "DEVICE AND METHOD FOR CALIBRATING ANTENNA ARRAY SYSTEMS" which application is incorporated by reference herein in its entirety.

An algorithm such as Delay and Sum (DAS) may be used for reconstructing an image from the impulse responses of the medium. Other algorithms may be used for imaging as well.

According to some embodiments of the present invention there are provided methods and systems applicable to a number of sensing scenarios as will be further illustrated below.

The methods described herein apply to RF signals. Those skilled in the art would appreciate that the same or similar methods can be adopted for use with other sensing mechanism, for example sonar, ultrasound, optical signals, etc.

Referring now to the drawings, FIG. 1A illustrates an RF measuring system 100 configured to sense or image a medium and/or objects within the medium, in accordance with embodiments of the invention. The system 100 comprises a measurement unit 130 configured to be attached or included in a device such as a portable device 120. According to some embodiments, the portable device 120 may be a handheld device or a handheld computer such as a mobile telephone, a smart phone, a tablet computing device, a laptop computing device, a personal digital assistant, a visible light camera, a personal video device or a music player, personal media, player, global positioning system navigational device, pager, portable gaming device or any other appropriate mobile device known in the art. For example, the measurement unit 130 may be configured to capture, characterize, image, sense, process, and/or identify, or define a medium and/or an object within the medium such as OUT (object under test) and provide an identification results relating to the OUT to the portable device 120 for use in any desired fashion (e.g., for further processing, to store in memory, to display, to use by various applications running on the portable device 120, to export to other de vices, or other uses).

In one embodiment, the sensor unit 130 may be a multi-layer structure implemented at least in part with printed circuit board techniques using appropriate dielectric materials. Commonly used materials are glass-epoxy. Teflon-based materials. Layers of high-dielectric-constant materials can be incorporated in order to match the antennas to materials under test.

The measurement unit 130 may include or may be connected to a transmit/receive subsystem 104, a data acquisition subsystem 106, a data processing unit 108, additional sensors such as accelerometer 111 and imager 113 and a console 110.

According to some embodiments of the invention the measurement unit comprises an array, the array comprises one or more transducers, wherein at least one of said at least two transducers is configured to transmit a signal towards a medium or objects, and at least one transceiver attached to the transducers, the at least one transceiver is configured to transmit at least one signal toward the medium and receive a plurality of signals affected by the medium.

Specifically, the measurement unit 130 may include one or more antennas such as antenna array 102. For example the antenna array 102 may include multiple antennas 102a-102e typically between a few and several dozen (for example 30) antennas. The antennas can be of many types known in the art, such as printed antennas, waveguide antennas, dipole antennas or "Vivaldi" broadband antennas. The antenna array can be linear or two-dimensional, flat or conformal to the region of interest.

According to some embodiment of the invention the antenna array 102 may be an array of flat broadband antennae, for example spiral shaped antennae. The antenna array 102 may include a layer of matching material for improved coupling of the antenna radiation to the materials or objects under test. The unique and optimized shape of the antenna array, enables their use in limited sized mobile devices, such as a thin, small-sized smart phone or tablet. In addition, the use of an antenna array made as flat as possible, for example in a printed circuit, allows for the linkage of the measurement unit 130 to any mobile device known in the art, as it does not take up much space in the mobile device, it is not cumbersome, nor does it add significant weight to the portable device 120.

In some cases the measurement unit 130 may be a standalone unit, for example attached to or connected to a computer device via wire or wireless connections such as USB connection or Bluetooth™ or any electronic connection as known in the art.

The transmit/receive subsystem 104 is responsible for generation of the microwave signals, coupling them to the antennas 102a-102e, reception of the microwave signals from the antennas and converting them into a form suitable for acquisition. The signals (e.g. RF signals) can be pulse signals, stepped-frequency signals, chirp signals and the like. The generation circuitry can involve oscillators, synthesizers, mixers, or it can be based on pulse oriented circuits such as logic gates or step-recovery diodes. The conversion process can include down conversion, sampling, and the like. The conversion process typically includes averaging in the form of low-pass filtering, to improve the signal-to-noise ratios and to allow for lower sampling rates. The transmit/receive subsystem 104 can perform, transmission and reception with multiple antennas at a time or select one transmit and one receive antenna at a time, according to a tradeoff between complexity and acquisition time.

The data acquisition subsystem 106 collects and digitizes the signals from the transmit/receive subsystem 104 while tagging the signals according to the antenna combination used and the time at, which the signals were collected. The data acquisition subsystem will typically include analog-to-digital (A/D) converters and data buffers, but it may include additional functions such as signal averaging, correlation of waveforms with templates or converting signals between frequency and time domain.

The data acquisition subsystem 106 may include a Radio Frequency Signals Measurement Unit (RFSMU) such as a Vector Network Analyzer (VNA) for measuring the received/reflected signals.

The data processing unit 108 is responsible for converting the collected signals into a set of responses characterizing the OUT, and performing the algorithms for converting the sets of responses, for example into medium sensing data.

An example of algorithm, for converting the sets of responses may be for example Delay and Sum (DAS) algorithm described above.

According to some embodiments, the system may include an accelerometer 111 to fine tune and give additional data in respect to fee movement, the distance of the device.

Additionally, the device may include an imager 113 to obtain the device relative location or movement in respect to a reference location, as will be illustrated in details hereinabove.

A final step in the process is making use of the resulting parameters or image, either in the form of visualization, display, storage, archiving, or input to feature detection algorithms. This step is exemplified in FIG. 1A as console 110. The console for example in a mobile device is typically implemented as a handheld computer such as a mobile telephone or a table computer with appropriate application software.

According to system type, the computer can be stationary, laptop, tablet, palm or industrial ruggedized. It should be understood that while FIG. 1A illustrates functional decomposition into processing stages, some of those can be implemented on the same hardware (such as a common processing unit) or distributed over multiple (such as graphical processing unit, GPU) and even remote pieces of hardware (such as in the case of multiprocessing or cloud computing).

According to one embodiment of the invention, subsystems 106, 108 and 110 may be part of the measurement unit or the portable device 120, as shown in FIG. 1A. Alternatively the measurement unit 130 may be included within a housing 125 such as case or a jacket configured to be releasable (i.e. connected or disconnected) to the portable device 120. For example the measurement unit 130 may include the antenna array unit 102 and the transmit/receive-subsystem 130 may be part of the housing 125 which is electrically or wirelessly connected to the portable device 120, for example through a dedicated connection such a USB connection, wireless connection or any connection known in the art.

Following the connection of the sensor unit 130 to the portable device, the sensor unit 130 may utilize the portable device's own data acquisition, data processing display, storage and analysis subsystems.

Figure 1B:
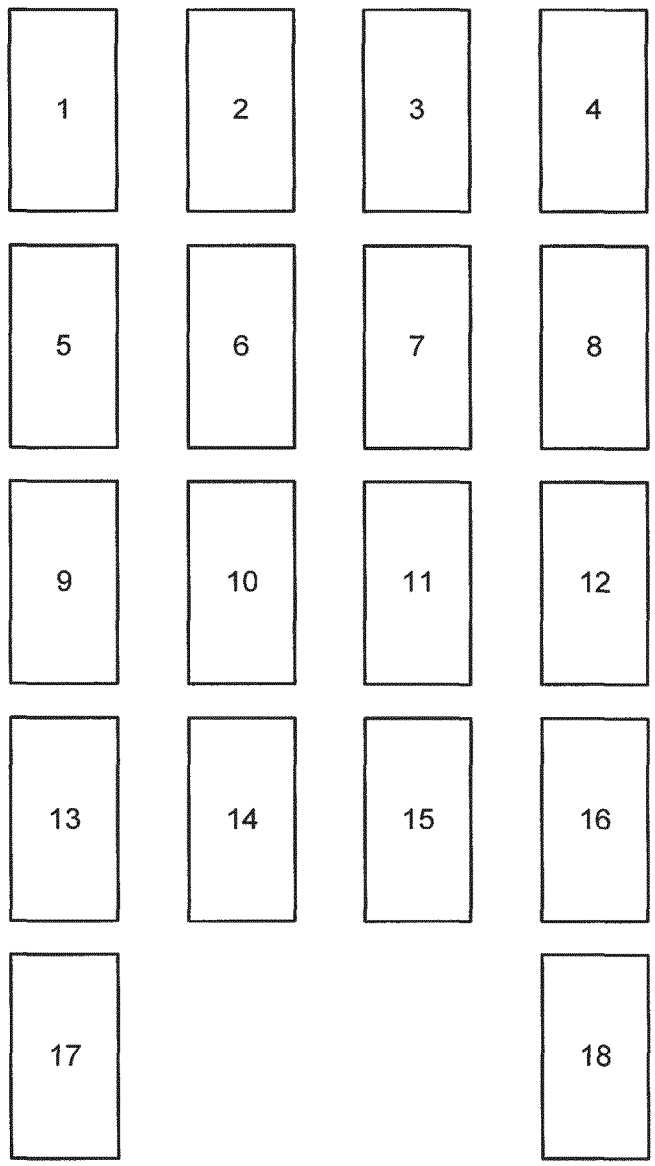
FIG. 1B is a schematic view of an antenna array, in accordance with embodiments of the invention.

FIG. 1B schematically illustrates an antenna array according to an embodiment of the present invention, the planar antenna array comprises of 18 antennas arranged with equal distances of for example about 2 cm (in some embodiments the distance may be smaller or larger) and configured for transmission and reception in the UWB frequency range.

Figure 1C:
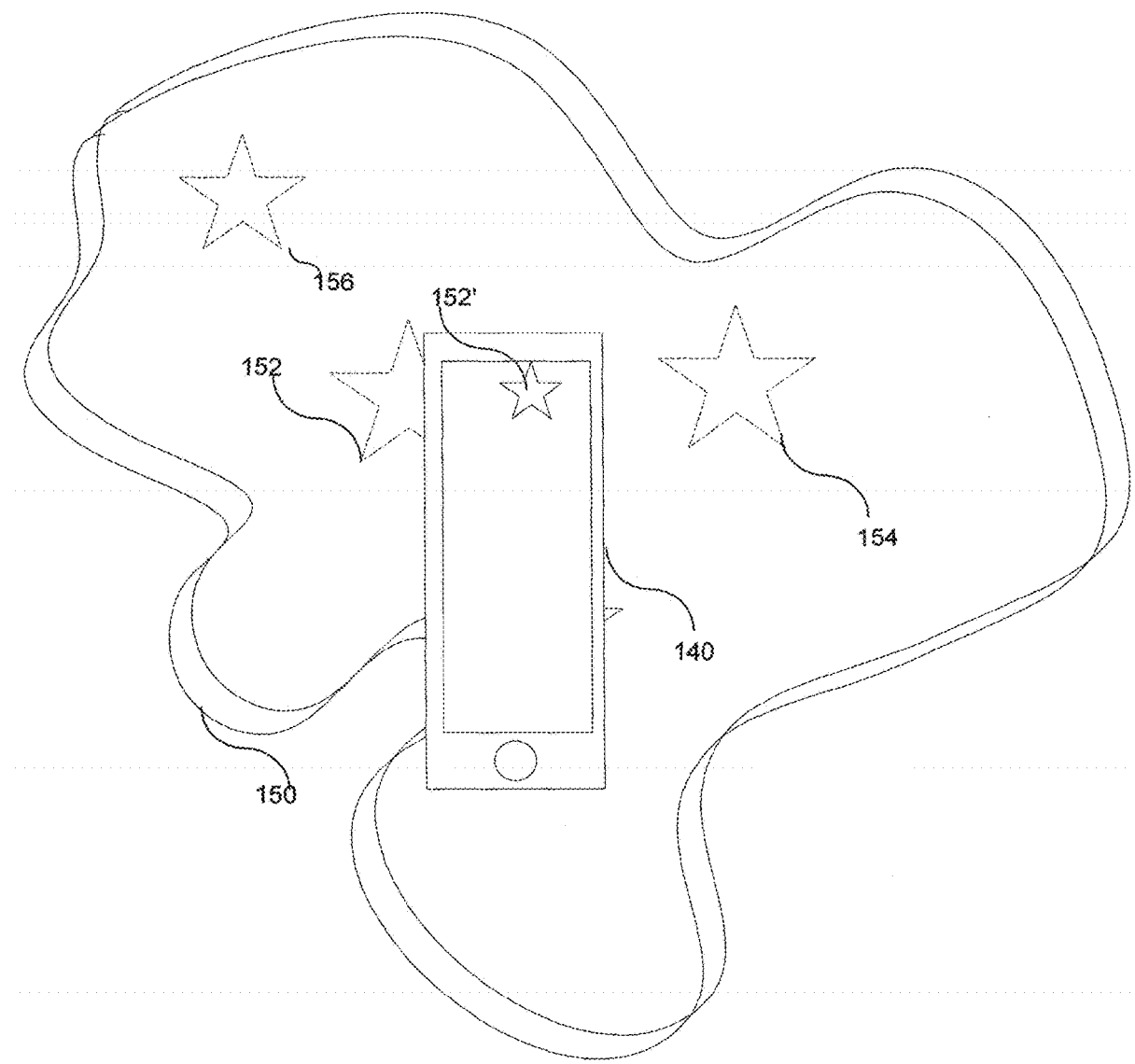
FIG. 1C is a schematic view of a mobile phone comprising an array sensing or imaging a surface of an object, in accordance with embodiments of the invention.

FIG. 1C illustrates a mobile device 140 such as a mobile phone comprising an array such as an RF antenna array for sensing or imaging a surface of an object 150 (e.g. wall) and internal parts or elements such as elements 152 and 154 and 156.

Figure 1D:
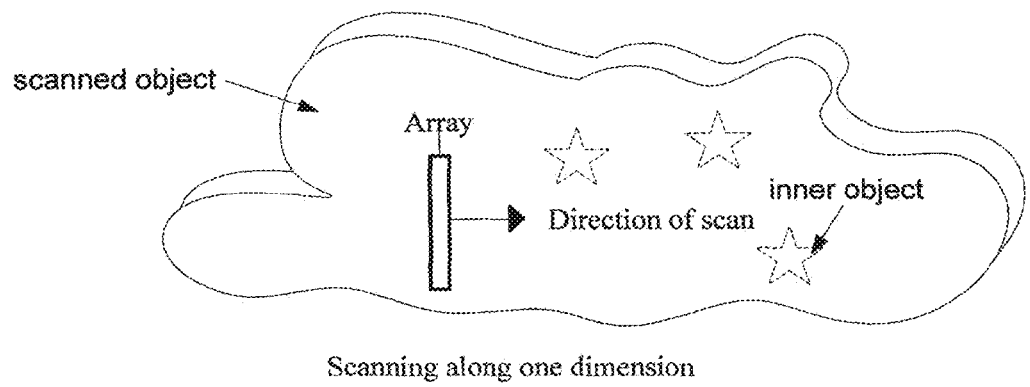
FIGS. 1D-1F are schematic view of different movements of an object or device comprising an array, in accordance with embodiments of the invention.
Figure 1E:
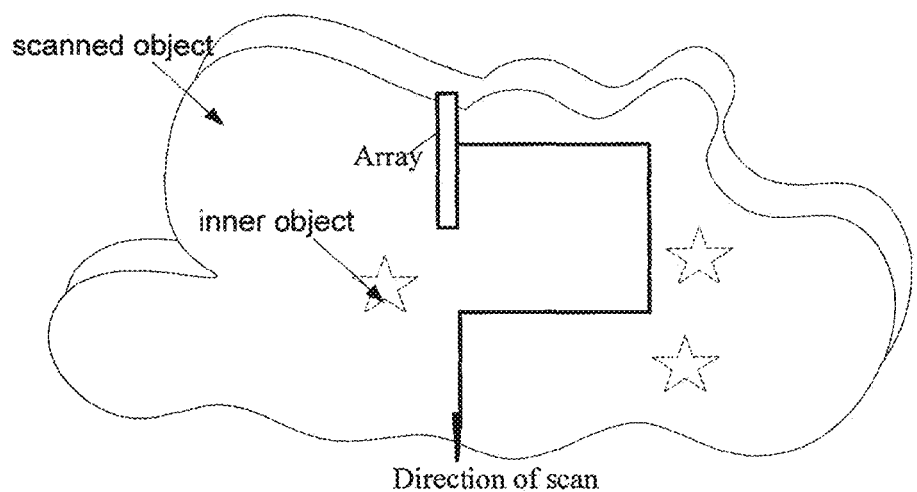
Figure 1F:
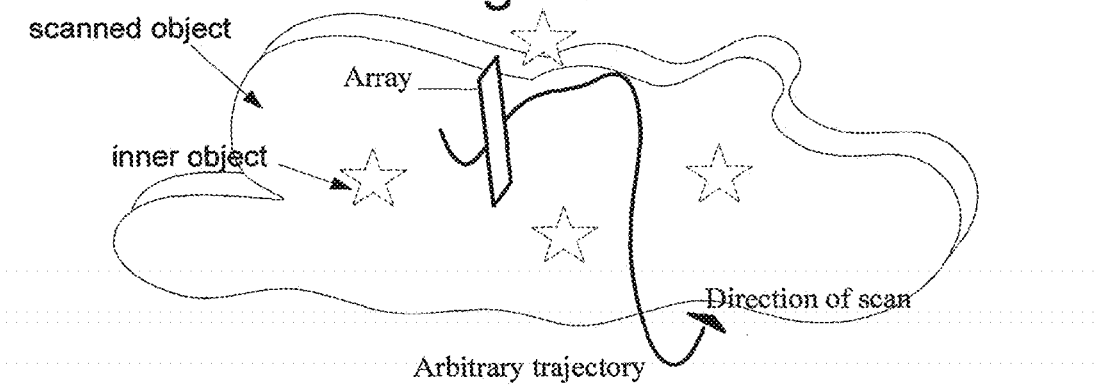

In an exemplary operation the device 140 is interfaced or held in close proximity to the wall (typically less than quarter of a wavelength, e.g. 1cm for the UWB frequency range) and moved along the wall during a scanning process to image the external and internal parts of the wall. As illustrated in FIGS. 1D-1F, the movement of the device (and the array) may be unidimensional for example as shown in in FIG. 1D the device (i.e. and the array) may be swept from left to right in X axis or Y axis of a Cartesian coordinate system, possibly alternating the direction or the dimension of movement during sweep (FIG. 1E), or a two dimensional movement, as shown in FIG. 1E or an arbitrary freestyle trajectory over the wall as shown in FIG. 1F.

In some cases, a location in three dimensions of a device having an antenna array may be estimated using a three-dimensional antenna array.

According to another embodiment of the invention there is provided a subsurface imaging (e.g. ground-penetrating radar) system and methods, wherein the antenna array may obtain signals reflected or affected from or by the surface of the object for localization of the device while the imaging is mainly concerned with subsurface targets.

Subsurface imaging is defined as a process of imaging an object (herein after object(s), sample(s), target(s), substance(s) object under test (OUT)) having a plurality of surfaces or layers, including imaging the objects surfaces, and locating reflectors within the object.

Accurate relative location of the antenna array (between multiple snapshots) is significant either for synthetic aperture imaging (where the array is moved during imaging) or in order to merge multiple single-snapshot images into a single image of the scene.

For example, as shown in FIG. 1C the device 140 may image a complete image of a scene (e.g. the wall 150 and the inner layers or elements 152-156 in the wall) the image may be stored in memory, such as in the device local database memory. A user may operate methods according to the invention to image and see part of the image, such as internal parts of the image, relevant to the current location of the imaging device. For example, for an in-wall imaging the device 140 held against the wall 150 in proximity to inner element 152, an image 152' of inner element 152 device's screen will display an image of the inner wall structure which is currently just behind the device e.g. element 152.

According to another embodiment of the present invention, the imaging system or device may include a camera. For example, the antenna array may be attached to or be in communication with an electronic mobile device such as cellular phone or tablet including a camera. The camera may be a CCD camera or any camera known to those of skill in the art. It is stressed that the location methods described herein may operate with or without a camera.

According to some embodiments of the present invention the imaging system or device may comprise additional sensors such as accelerometers providing additional information regarding the orientation and the acceleration (from which a rough velocity and relative location estimations follow) of the imaging device (or the antennas). The additional information may be combined into the location estimation procedure described herein in order to reduce ambiguity and/or improve accuracy.

Location Using Recorded Signals

Disclosed herein are methods and devices for measuring a movement of a sensing device comprising or attached to an array such as an array including a transmit and receive antennas, relative to a reference location. These methods and devices may be incorporated with any embodiment of a compact or mobile device as described herein.

In operation, electromagnetic (EM) signals, such as RF signal are transmitted from some or all antennas in the array (e.g. transmitting antennas), and received by some or all antennas (receiving antennas or transceiver), of the sensing device (e.g. an imaging device) in order to estimate a plurality of measurements, e.g. transfer function between the antennas. The signals may be swept in frequency or m time. The signals may be calibrated in order to correctly estimate the transfer function between any two antennas in the array. It is to be understood that the term "signal" hereinafter refers to the estimated transfer function.

Unlike methods using the reflections from given targets, according to the present invention embodiments, the signals which are recorded in various pairs of antennas may include a mixture of returns from various reflectors of the scene, including targets in the scene, such as pipes and small cavities, inhomogenuities in a cement block, air cavities in a hollow bock, the attenuation through the directly interfacing media, far reflectors such as other walls, etc. In short—any object that generates a reflection. These generate an effective "Green's" function between any two locations in space, i.e. this function describes the transfer function between an antenna placed at a given location (and orientation) and an antenna placed in any other location and orientation. This function changes in a smooth manner over space. Assuming multiple scatters, the spatial correlation of this function is typically of the order of magnitude of the wavelength.

For a general localization, a dynamical model of the movement of the array (which may be for example hand-held) is used. For example, this dynamical model may assume a random acceleration, and that the velocity and location evolve as integrals of the acceleration. The model produces a probability for each possible trajectory.

Additionally, a second model for the recorded signals is used. The signals are modelled as the sum of (a) an unknown function depending on the transmit and receive location (the aforementioned "Green" function), and (b) a random perturbation per measurement (representing the measurement noise, differences between antennas, etc.). Given these two models, the most-likely movement trajectory given the recorded signals, is found. Several specific examples are given below.

For the case of unidimensional localization, a direct comparison of the signals from pairs of antennas in the direction of movement can be used. Suppose the array is moved only in the X direction, and the antenna spacing is L.

Figure 2:
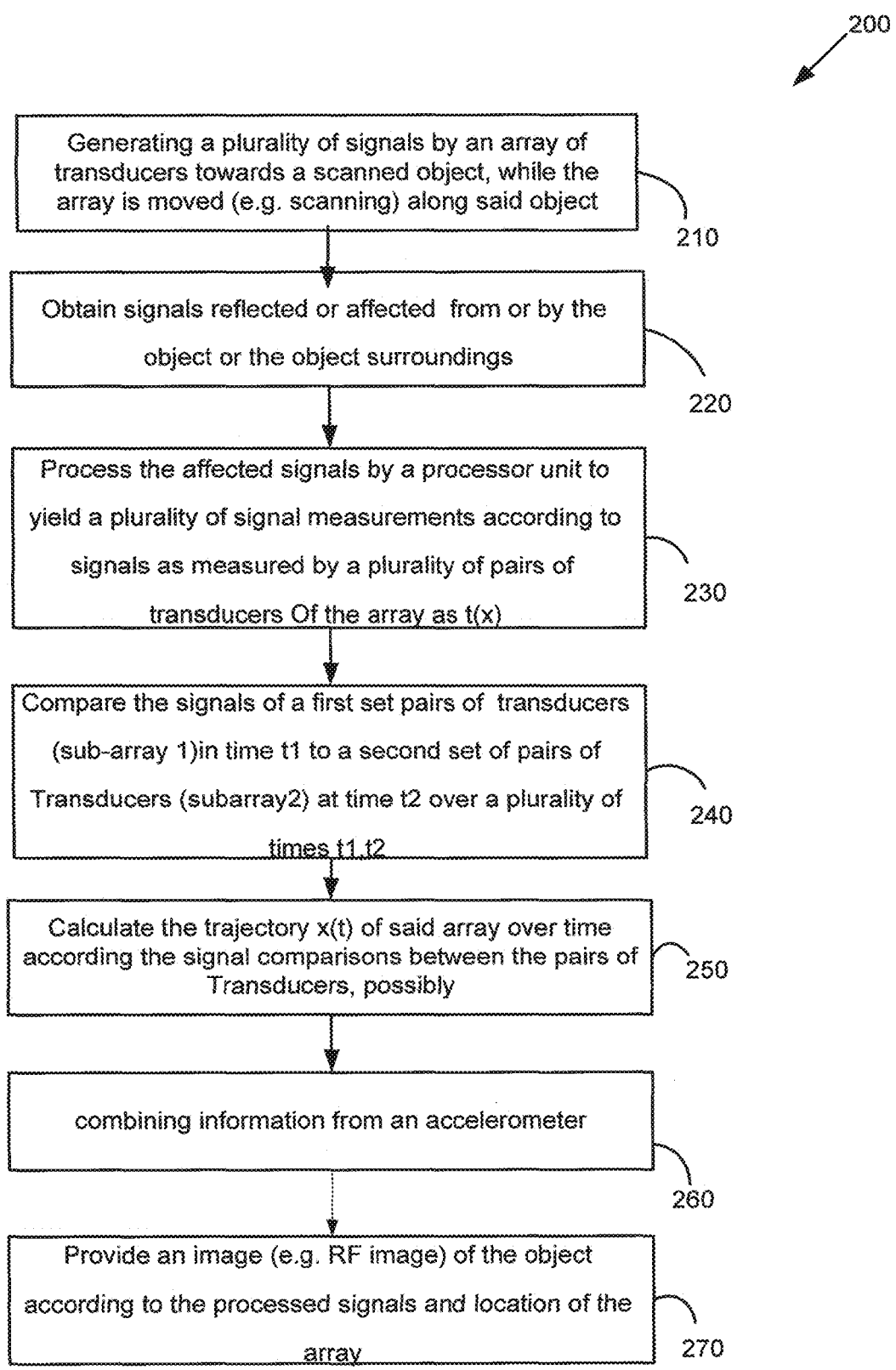
FIG. 2 shows a process flow diagram of a method for measuring a movement of a sensing device, in accordance with embodiments of the invention.
Figure 3:
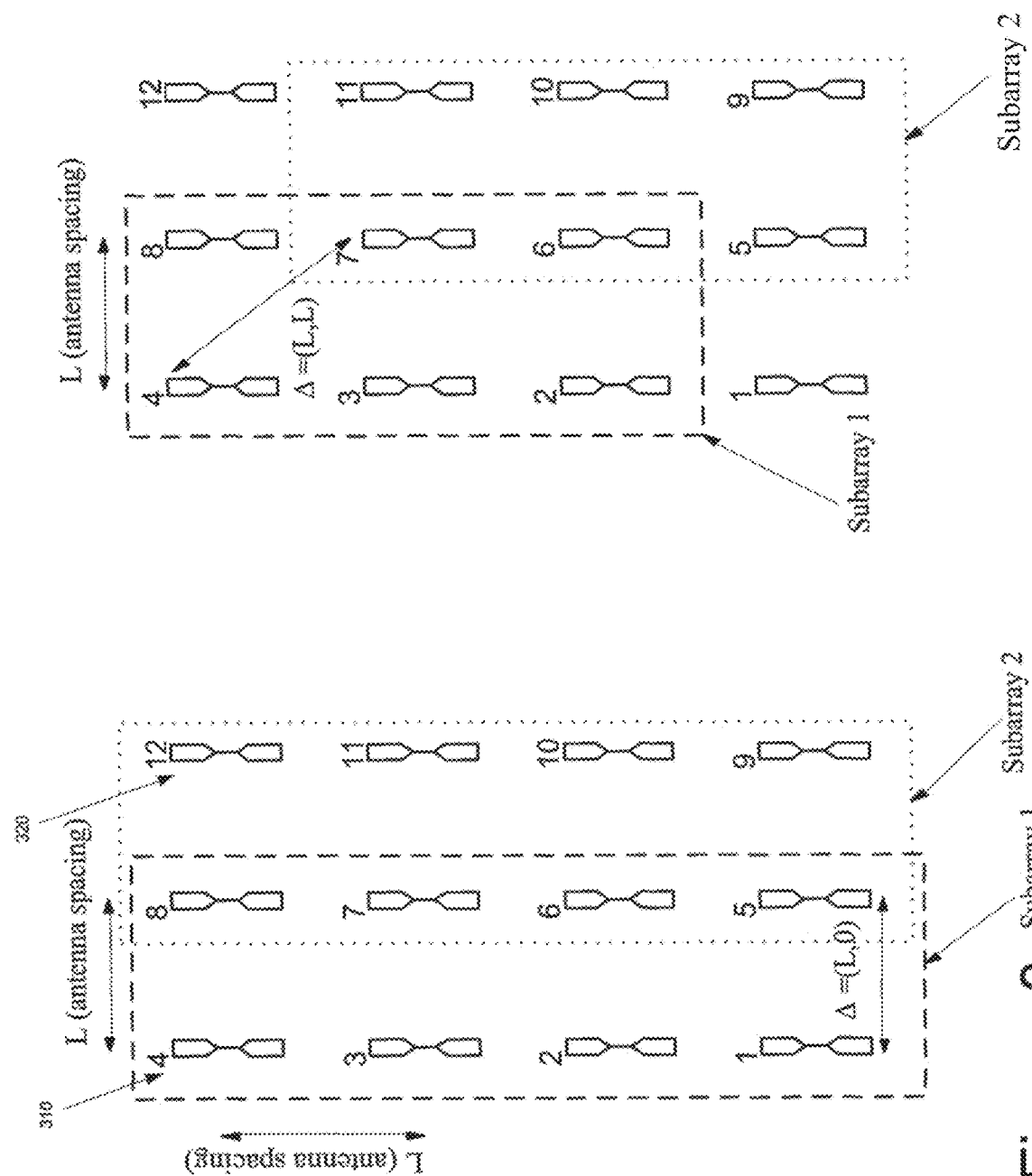
FIG. 3 is a schematic view of a 4×3 antenna array, in accordance with embodiments of the invention.

FIGS. 2 and 3 illustrate, accordingly, a flowchart 200 of a method for measuring a movement of a sensing device composing or attached to an array, such as antenna array 300, relative to a reference location, in accordance to embodiments of the invention.

As shown in FIG. 3 the array 400 may be a 3×4 array comprising two or more sub-arrays comprising a plurality of transducers (e.g. antennas). For example the array may include two sub-arrays 310 and 320 each including 8 transducers.

At step 210 a plurality of signals are emitted by the array of transducers towards a scanned object (e.g. wall), while the array is moved (e.g. scanning) along said object.

At step 220 signals reflected or affected from or by the object or the object surroundings are obtained by the array 300.

At step 230 signals of a first set of pairs of transducers (e.g. sub-array 310) in time t1 are compared to a second set of pairs of transducers (e.g. sub-array 320) at time t2 over a plurality of times t1,t2.

At step 240-250 a trajectory x(t) of said array (or device holding the array) over time are calculated according a signal comparisons between the pairs of transducers and optionally at step 260 the calculated comparisons results are combined with information from accelerometer, such as accelerometer 111 attached to array or the mobile device.

At step 270 an image (e.g. RF image) of the scene/object (e.g. the wall) is provided according to the processed signals and location of the array. The RF image may be processed in real time or off-line for example by an external processing unit.

Figure 4A:
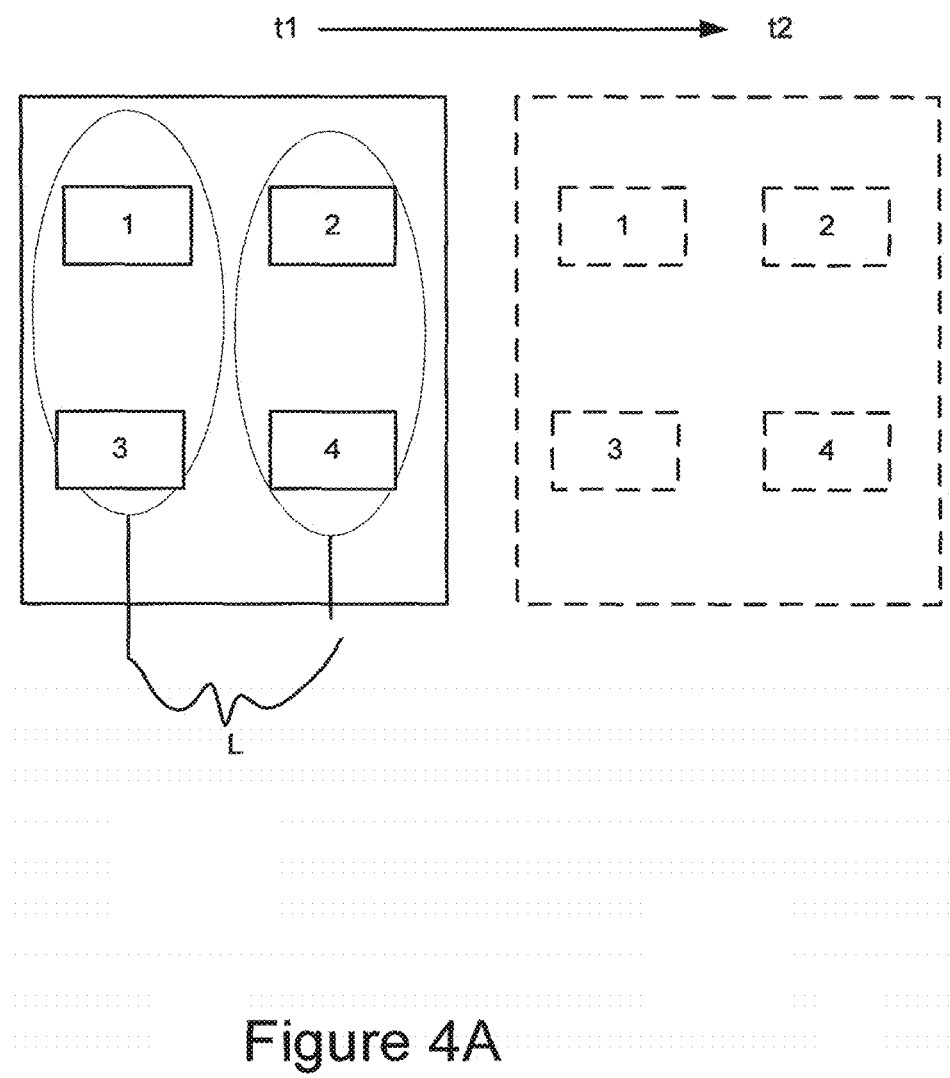
FIGS. 4A-B illustrate a movement of a 2×2 antenna array in accordance with embodiments of the invention.
Figure 4B:
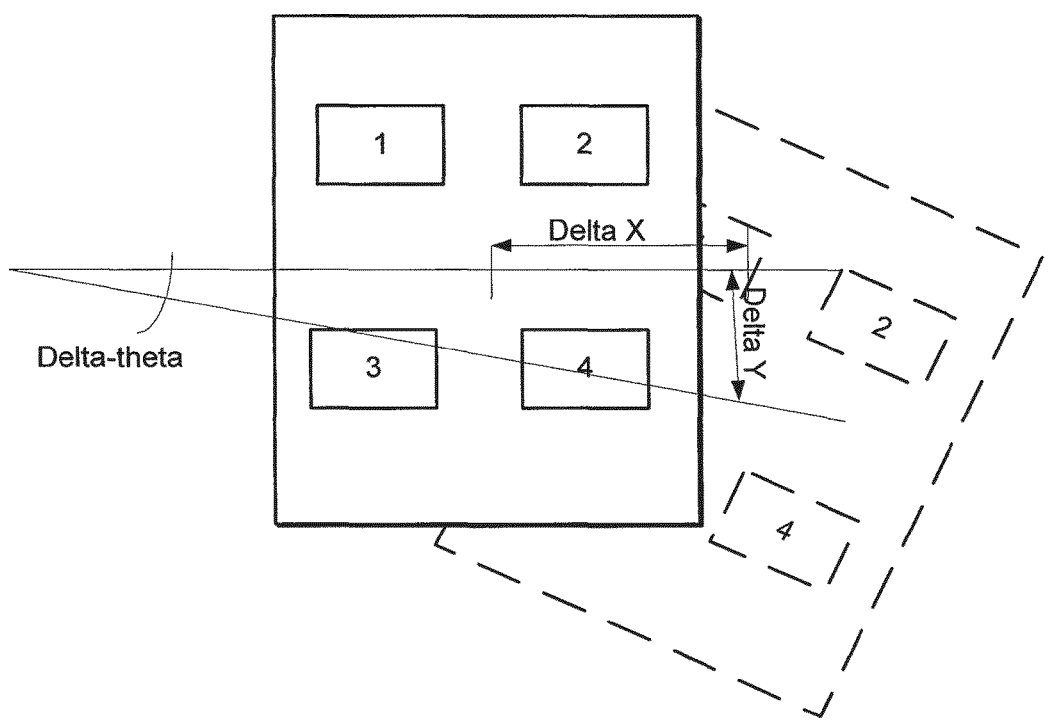

Specifically, the location measurement of the antenna array me be measured as follows: for an array such as a 2×2 antenna array of FIG. 4 signals of antenna pairs 1-3 and 2-4 are compared in two recording times T1 and T2 where L is the distance between the pairs. Denoting a signal transmitted from antenna i to antenna j at an antenna array at time t as $S_{ij}(t)$:
 1. If $S_{12}(T_1) \approx S_{12}(T_2)$ and $S_{34}(T_1) \approx S_{34}(T_2)$ the conclusion is that it's likely that at times $T_1,T_2$ the array was at the same location.
 2. If $S_{12}(T_1) \approx S_{34}(T_2)$ the conclusion is that it's likely that between times $T_1,T_2$ the array was moved distance L to the left, and therefore antenna pair 3-4 is now at the same location where antenna pair 1-2 was before.
 3. Similarly, if $S_{34}(T_1) \approx S_{12}(T_2)$ the conclusion is that it's likely that between times $T_1,T_2$ the array was moved distance L to the right.

The notation $A \approx B$ implies A,B match under some closeness metric (for example the L2 metric). These temporary conclusions are then combined with the dynamical model in order to reduce errors and rule out incorrect paths.

When a larger array is available such a 4×3 antenna array as shown in FIG. 3 the comparisons are preformed between all or part of the antenna pairs at a certain portion of the array, and all pairs which are a translation of this portion L to the left or right (assuming horizontal movement). So, for example for the array of FIG. 3 the signals of all pairs in the antenna group 1-8 are compared simultaneously to the signals of all pairs in the antenna group 5-12 (where pair (i,j) is compared against (i+4,j+4)), and against themselves, to generate the decision whether the array was moved left, right, or was static.

Details of a localization algorithm based on these principles are as follows:
 1. Find displacements $\Delta=(\alpha_x,\Delta_y)$ (one or more values of $\Delta$), such that there exist two ordered sets of antenna pairs in the array, $L_p=(i_p,j_p),R_p=(i'_P,j'_P)$ for $p=1, \ldots, N_p$, such that all antenna pairs $R_p^{(\Delta)}=(i'_P,j'_P)$ have the same relative location and orientation to antenna pairs $L_p^{(\Delta)}=(i_p,j_p)$, except that the antenna location is shifted by $\Delta$. I.e. for example, antenna $i'_p$ is shifted $\Delta$ compared to $i_p$ and antenna $j'_p$ is shifted $\Delta$ compared to $j_p$, or vice versa: antenna $j'_p$ is shifted $\Delta$ compared to $i_p$ and antenna $i'_p$ is shifted $\Delta$ compared to $j_P$. These ordered sets are now identified with $\Delta$. Each set effectively defines a sub-array of the antenna array. These sub-arrays may be partially or fully overlapping, as shown in FIG. 3. For example, in the antenna array of FIG. 3 assume the distance between adjacent antennas is L, then there are such groups for $\Delta=(0,0),(L,0),(0,L),(0,2L)$, etc.
 2. At each location (while the array is moved along the surface), transmit and record signals from some of all antenna pairs. Each such complete recording of antenna pairs over frequency or time is called "snapshot". Calibrate the signals by dividing by reference signals in order to compensate the effects of traces, cables, etc. and obtain the transfer functions between antennas. Denote by $S_{ij}(T)$ the transfer function (in frequency domain or time domain) measured at the snapshot taken at time T between ports i,j.
 3. Compare transfer functions taken at each location to transfer functions taken at other locations using a comparison metric, producing a one or more comparison matrices wherein each snapshot is compared to each other snapshot. For each value $\Delta$ we generate a matrix $D_\Delta(T_1,T_2)$ containing for each pair of snapshots (T1,T2) the comparison result. $D_\Delta(T_1,T_2)=\mu(\{S_{ij}(T_1), S_{i'j'}(T_2)\}_{(i,j)\in L^{(\Delta)},(i',j')\in R^{(\Delta)}})$, where $\mu$ is a metric. For example, $$\mu = \sum_{(i,j)\in L^{(\Delta)},(i',j')\in R^{(\Delta)}} \frac{\|S_{ij}(T_1) - S_{i'j'}(T_2)\|^2}{P_{ij} + P_{i'j'}}$$

where $\|S\|^2$ is L2 norm (sum of squares) over frequency or time domain of the signal, and $P_{ij}$ are powers of the signals, either estimated or known apriori.
 4. Calculate log-likelihood functions for each displacement over all combinations of $T_1,T_2,\Delta$. The log-likelihood that the distance $x(T_1)-x(T_2)$ between the measurements taken at times $T_1,T_2$ is $\Delta+d$ is determined as function of $D_\Delta(T_1,T_2)$. For example this function may be:

$$L(d = x(T_1) - x(T_2) - \Delta) = \left(\log(1-\rho^2) - \frac{2\rho}{1+\rho}\right) + \frac{\rho}{(1-\rho^2)} D_\Delta(T_1, T_2)$$

where $$\rho(d) = \rho_{max} \cdot \exp\left(-\left(\frac{d}{L_{coh}}\right)^2\right)$$

is an assumed spatial correlation function with parameters $\rho_{max}$ (maximum correlation) and $L_{coh}$ (coherence length).
 5. Calculate the log-likelihood of each trajectory using the movement model. For example, using $$L_M(x(T_1), x(T_2), x(T_3)) = \frac{1}{2\sigma_a^2}\left[\frac{(x(T_1) - 2x(T_2) + x(T_3))}{(T_3 - T_1)^2} - \hat{a}(T_2)\right]^2$$

where $T_1, T_2, T_3$ here are 3 consecutive snapshots, $\hat{\alpha}$ is art optional side-information on acceleration (e.g. given from an accelerometer), which is 0 in case no such information exists, and $\sigma_\alpha^2$ is the level of certainty (standard deviation) attributed to the acceleration (or the acceleration error in case a measurement from an accelerometer is given).

6. Infer the trajectory (displacement trajectory x(t), or x(t) and y(t) in two dimensions) from the set of (on or more) matrices $D_A(T_1,T_2)$, by solving a maximization problem: find the trajectory x(t) such that the sum of the functions $L(x(T_1)-x(T_2)-\Delta)$ for all combinations of $T_1, T_2, \Delta$, plus the sum of $L_M(x(T_1),x(T_2),x(T_3))$ is maximized over all x(·). This problem may be solved, for example, by iterative methods in which the location of each snapshot, or the probability function of the location is calculated given the locations of other snapshots and the aforementioned likelihood functions.

According to other embodiments of the present invention, for a two dimensional localization supporting freestyle movement (i.e. FIG. 1F) the localization method comprises of interpolating the signals of the antenna array and then comparing the received signals to past signals. For example, in the array illustrated in FIG. 4B, the signals of the entire army may be used. These signals are interpolated to reflect a small shift of ΔX,ΔY in the location and an angular change of Δθ in orientation, i.e. the interpolated signals reflect the signals that would have been measured by the same antennas, if the array had been shifted by ΔX,ΔY in location and Δθ in orientation. This interpolation over the two-dimensional Green's function in space can be implemented via linear interpolation, cubic interpolation, Wiener filtering, etc. Then, the signals after interpolation at time T1 are compared against the signals without interpolation at time T2 using a comparison metric as described above. If a match is found for some value of ΔX,ΔY,Δθ, the conclusion is that with high likelihood, between times T1 and T2, the array has been shifted by ΔX,ΔY,Δθ. Then, these estimated shifts are integrated to yield the overall displacement and rotation from the starting point. It should be noticed that this method generalizes the previous method, because an interpolation of ΔX=L,ΔY=0,Δθ=0 is just a shift of one "column" in the array.

Depending on the velocity in which the imaging system is moved, the location information may be computed based on the signals recorded for imaging. However, if the velocity is such that during the measurement time the system moves a significant part of the wavelength, then location finding can be based on faster measurements which occur in the background.

For example, suppose a complete scan of 200 antenna pairs and 100 frequencies takes one second, then a taster scan of 10 pairs and 10 frequencies may be used for localization. Notice that, it is possible to operate on a highly decimated or partial frequency range, on which imaging is not possible (doe to ambiguity generated by sub-sampling).

In some embodiments, non-uniform arrays or multi-frequency arrays may be used to yield additional information on location. For example, smaller, higher-frequency antennas, may be closely packed and thus supply more accurate location information.

Figure 5:
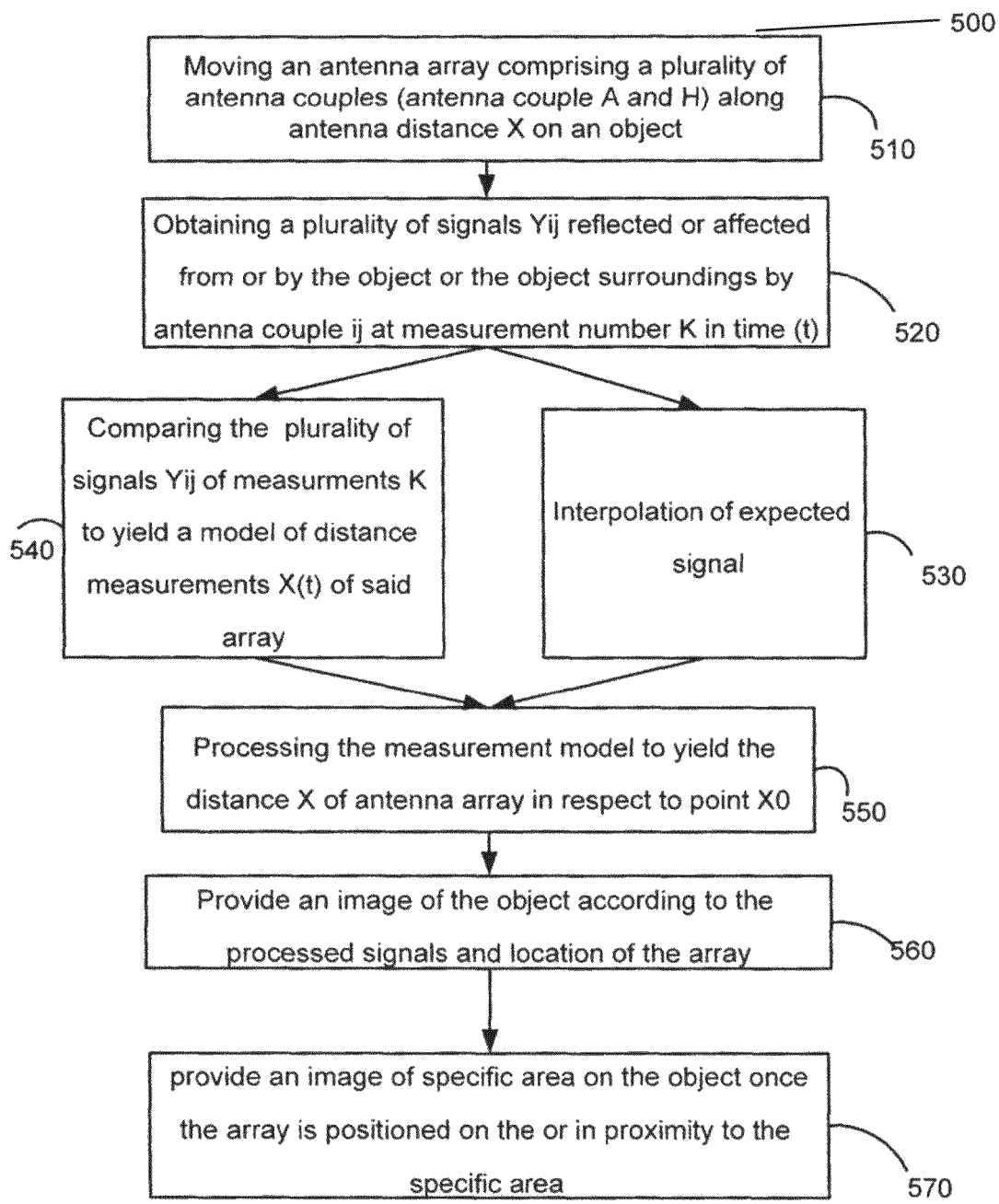
FIG. 5 shows a process flow diagram of a method for measuring a device or an object relative location in respect to a reference point in accordance with embodiments of the invention.

FIG. 5 is a flowchart 500 illustrating a method for measuring a device or an object relative location in respect to a reference point in accordance with another embodiment of the invention. At step 510 an antenna array or a device comprising the antenna array a plurality of antenna couples (antenna couple A and H) is shifted along antenna distance X on an object or in proximity to a surface object as illustrated in FIG. 1C. At step 520 a plurality of signals Yij reflected or affected from or by the object or the object surroundings or obtained by antenna couple ij at measurements K=1, . . . ,n in time (t0-tn). At step 530 and 540 the distance and direction is measured according to the type of movement of the array (or the device). For a single direction movement or scan, i.e. along X axis or Y axis of a Cartesian coordinate system (as illustrated in FIG. 1D) the distance and the direction is measured according to a comparison model as illustrated hereinabove, while for a free style movement as illustrated in FIG. 1F the distance is measured according to a interpolated signals model as explained herein above.

At step 550 the measurement models (i.e. comparison or interpolation models) are processed accordingly to yield the distance X of antenna array in respect to point X0.

At step 560 an image (e.g. RF image) of the scanned object and or inner layers or elements of the object are obtained according to the processed signals and location of the array. Alternatively the images are obtained from an imager and are merged according to the signal processing method as illustrated in steps 510-550.

At step 570 an image of specific area of the object is obtained once the array is positioned on the or in proximity to the specific area as illustrated in FIG. 1C.

Examples for embodiments of antenna array or imaging systems may be found in U.S. patent application Ser. No. 14/696,813, entitled "PRINTED ANTENNA HAVING NON-UNIFORM LAYERS" and PCT patent application number PCT/IL2015/050099 entitled "SENSORS FORA PORTABLE DEVICE" which application is incorporated by reference herein in its entirety.

Obtaining and Combining Location Information from a Camera

Figure 6:
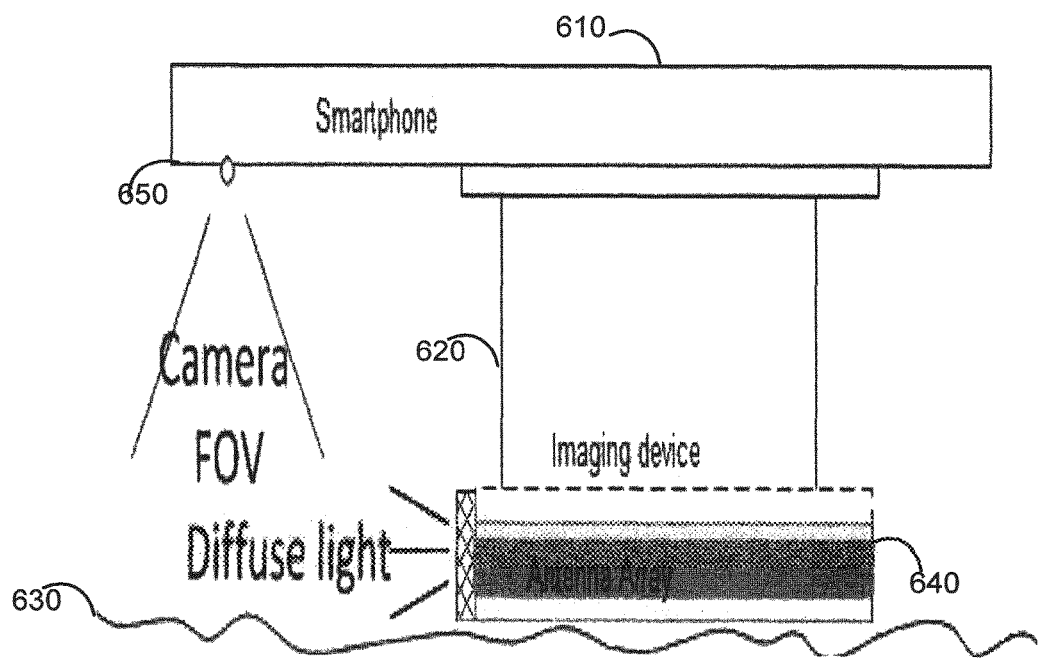
FIG. 6 shows a schematic drawing of a mobile device comprising an imager and an antenna array, in accordance with embodiments of the invention.

FIG. 6 shows a schematic drawing of a mobile device 610 such as a mobile telephone comprising a sensing module 620 for sensing (e.g. imaging) one or more objects such as object 630 surface e.g. wall), in accordance with embodiments of the invention. The mobile device 610 comprises a sensor such as RF antenna array sensor 640 and an imaging module such as a camera 650. The imaging module can be a CCD or 2D CMOS or other sensors, for example. In some cases the sensor 640 is attached to or placed in proximity to the camera 650 or to a platform which comprises a native camera or may be attached to an external a camera which may be combined or connected externally to the mobile device via an electronic connection such as a USB connection.

It is stressed that the present invention embodiments may operate for de-focused images and as a result a distance D between the camera and the surface being imaged may be smaller than the minimum distance required for focusing a camera, such as the mobile device camera.

In some cases, a light source (such as a LED) might be added or included in the mobile device to compensate for external lighting conditions.

In an embodiment, RF sensor 640 measurements and camera 650 images may be activated simultaneously, for example by the processing unit. Alternatively, each of the RF sensor 640 measurements and camera 650 images measurements may be attached, for example by the processing unit, with time-stamps reflecting the time when the array measurements and camera images are captured. At the following step, in post processing, the measurements are aligned to a unified time scale, by considering that any displacement estimated by the radar or camera or other device pertains to the time values in which the relevant measurements were taken.

Figure 7:
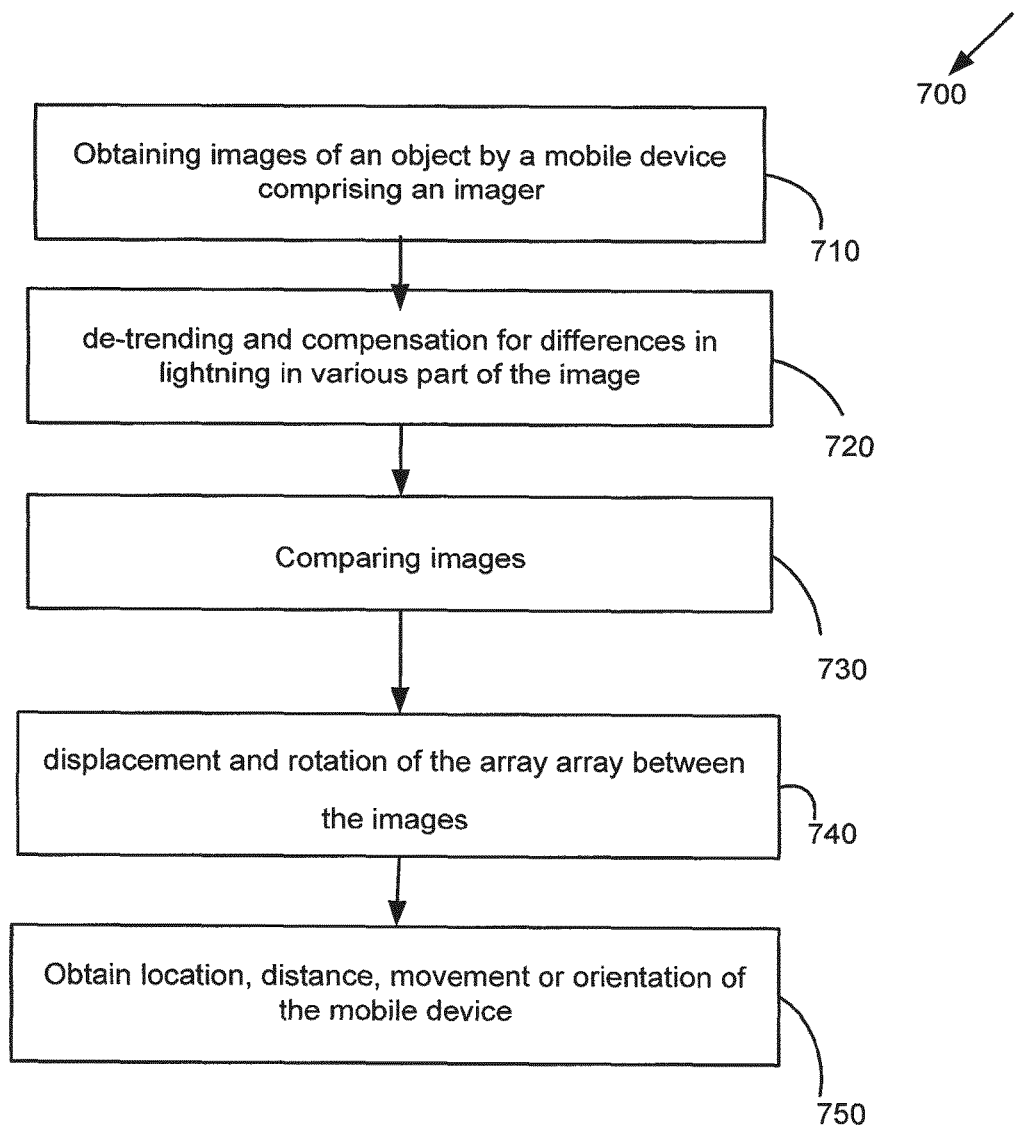
FIG. 7 shows a process flow diagram of a method for providing an image or location information of an object according to a plurality of images, in accordance with embodiments of the invention.
Figure 8:
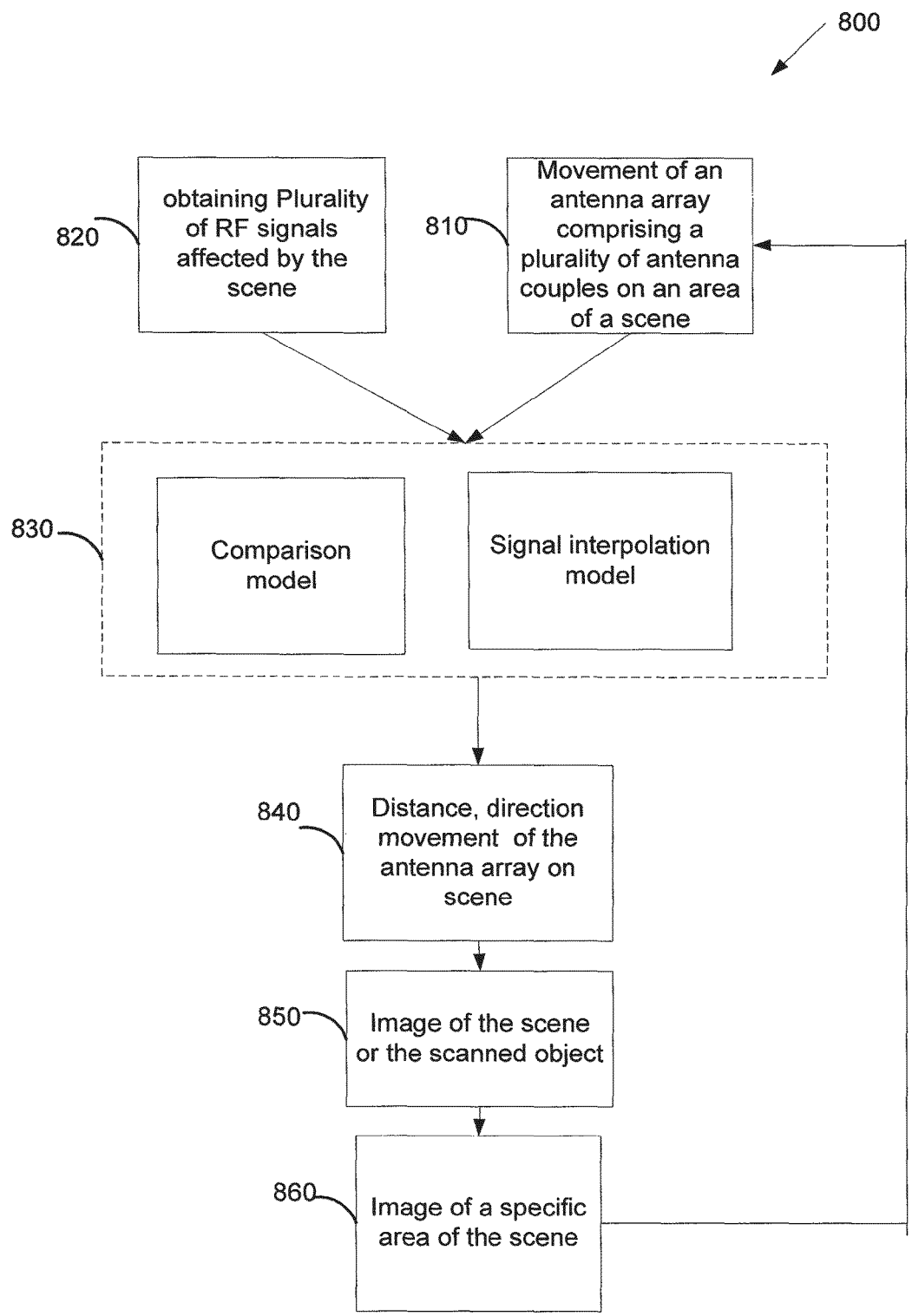
FIG. 8 shows a process flow diagram of a method for measuring a movement, and/or distance, and/or orientation of a device such as a mobile device comprising an array in respect to a reference point, in accordance with embodiments of the invention.

According to the embodiments of the present invention, the images obtained by the array and camera modules are processed to produce location information as will be illustrated in respect to FIG. 7-8, FIG. 7 is a flowchart 700 of a method for providing an image or location information of an object (e.g. a scanned or imaged object) according to a plurality of images, in accordance with embodiments of the invention. At step 710 a plurality of images of a surface of the object are obtained by a camera attached to a device such as a mobile device while scanning the object. At step 720 for differences in lightning in various part of the obtained images are de-trended and compensated. At step 730 the images such as, two camera images are compared to one another using one of a variety of algorithms, either by using correlation between features in the images or by detecting and matching feature points (for example "Global Motion Estimation from Point Matches" by Mica Arie-Nachimson et al. Weizmann Institute of Science, Rehovot, Israel, and "edge based image registration" by Thomas H. Henderson 1981).

In some cases, the images are high-pass filtered and cross-correlated in order to determine the shift and rotation between them. In some embodiments, a combination of images with small time gap and large time gap is used simultaneously. The pair of images with small time gap provide in-ambiguous location estimation, but possibly with larger accumulated error, while the comparison of the images with large time (e.g. displacement) gap improves the error.

At step 740 displacement and rotation of the array or the object between the images is found, and is transformed to real distance using calibration data obtained from the images.

At step 750, the location, movement or orientation of the mobile device is obtained by integrating the differential displacements measured from the images.

It should be stressed that according to the present invention there isn't any requirement for prior knowledge of the specific camera hardware.

Since the distance to the object's surface is relatively small, the distance between adjacent pixels is very small, and a very good estimation can be achieved for the displacement and rotation of the array in terms of the wavelength used for the array imaging.

According to some embodiments of the invention, the relative location and orientation information from the camera is combined with the relative location and orientation information from the signals as follows:
1. The estimation from signals may have an ambiguity as long as the displacement is smaller than L (the array spacing) and then, once a displacement L was performed, indicate very high confidence in that displacement. The location data from the camera is used to give initial location until a displacement L was done.
2. When the estimation from RF signals yields a specific known displacement (e.g. L) with high confidence, this displacement is used in order to calibrate the pixel size of the camera to actual displacement.
3. A "no movement" indication obtained using the RF signals may be used to turn-off the camera and save power.
4. The location information of all available sensors (RF signals, camera, accelerometers, etc) is combined by a single estimation algorithm where the log-likelihood of each possible trajectory is evaluated by considering the information of a specific sensor type, then these log-likelihoods are accumulated to determine the joint likelihood of the trajectory, and the most likely trajectory is selected. For practical implementation, this operation may be performed not for the entire trajectory, but for a small step each time.
5. Another sub-optimal way to combine information from the camera and the RF signals, is the follows: each algorithm produces a reliability metric for each location produced, and the most reliable location value it taken at each time.

Furthermore, in some cases, information from two antennas located at different positions in the device can be used in order to estimate orientation (rotation).

In some embodiments, where the information from RF signals is insufficient to locate the device, only the camera (in addition to optimally accelerometers) may be used for location.

Combining Information from Accelerometers

According to another embodiment of the present invention the system may comprise one or more accelerometers or may be in communication with one or more accelerometers to provide information including the device orientation and acceleration. As mentioned hereinabove, the estimation of location is done using the signals in conjunction with a dynamical model, evaluating which trajectories are likely and which aren't. When information from the accelerometers is received, it may be used to improve the specificity of this model. For example, if information from the accelerometers indicates that the device is moving right with a speed of between 5-10 cm/sec, then the dynamical model described herein above will be altered to incorporate the information and give a high likelihood to trajectories defined by speeds in this range.

In some applications, the scanning starts at rest (static position) and the information is utilized in order to calibrate the zero-velocity reading of the accelerometer so as to minimize accumulated drifts.

Figure 9:
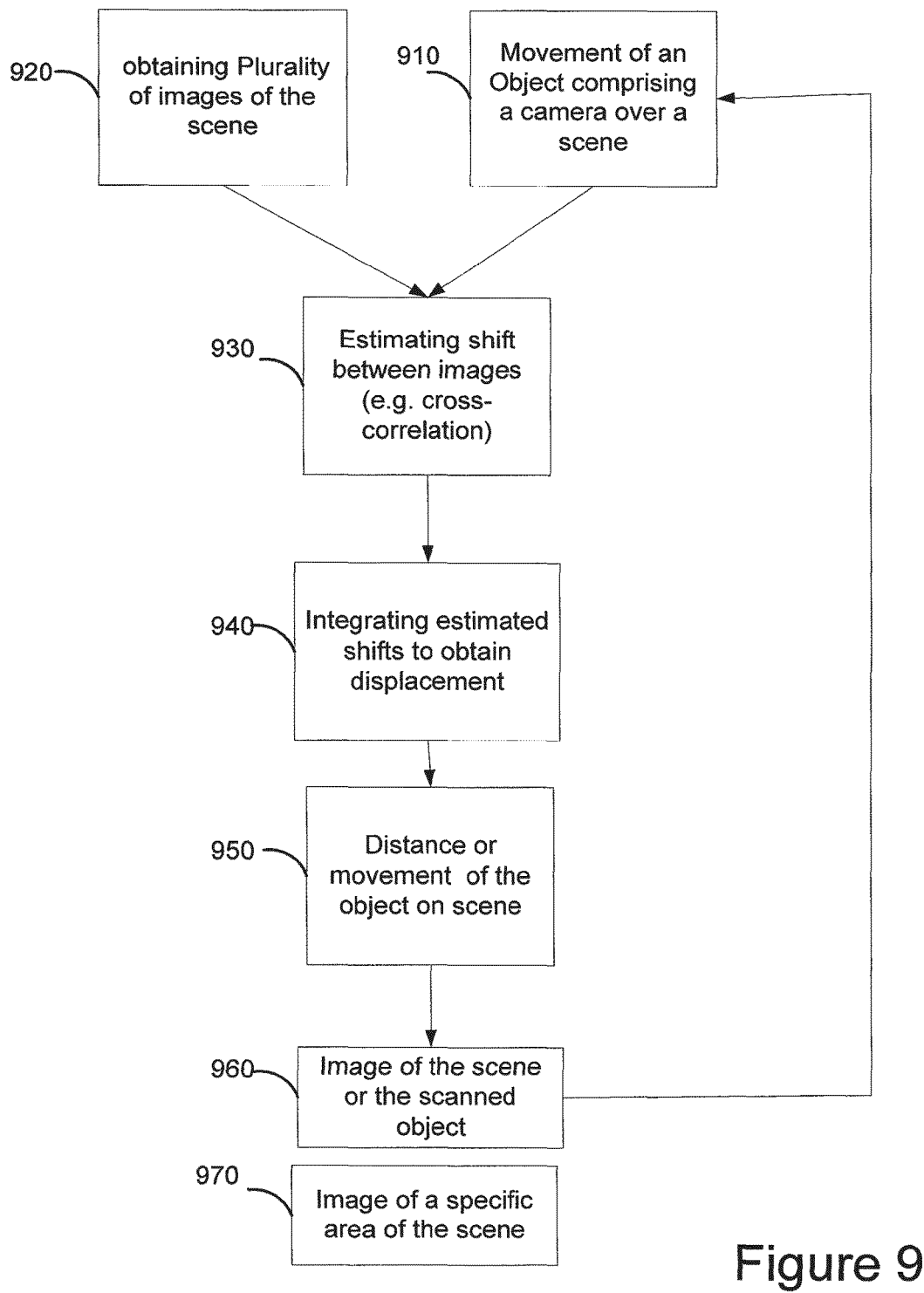
FIG. 9 shows a process flow diagram of a method for measuring a movement, and/or distance, and/or orientation of a device such as a mobile device comprising an image unit such as a camera in respect to a reference point, in accordance with embodiments of the invention.
Figure 10:
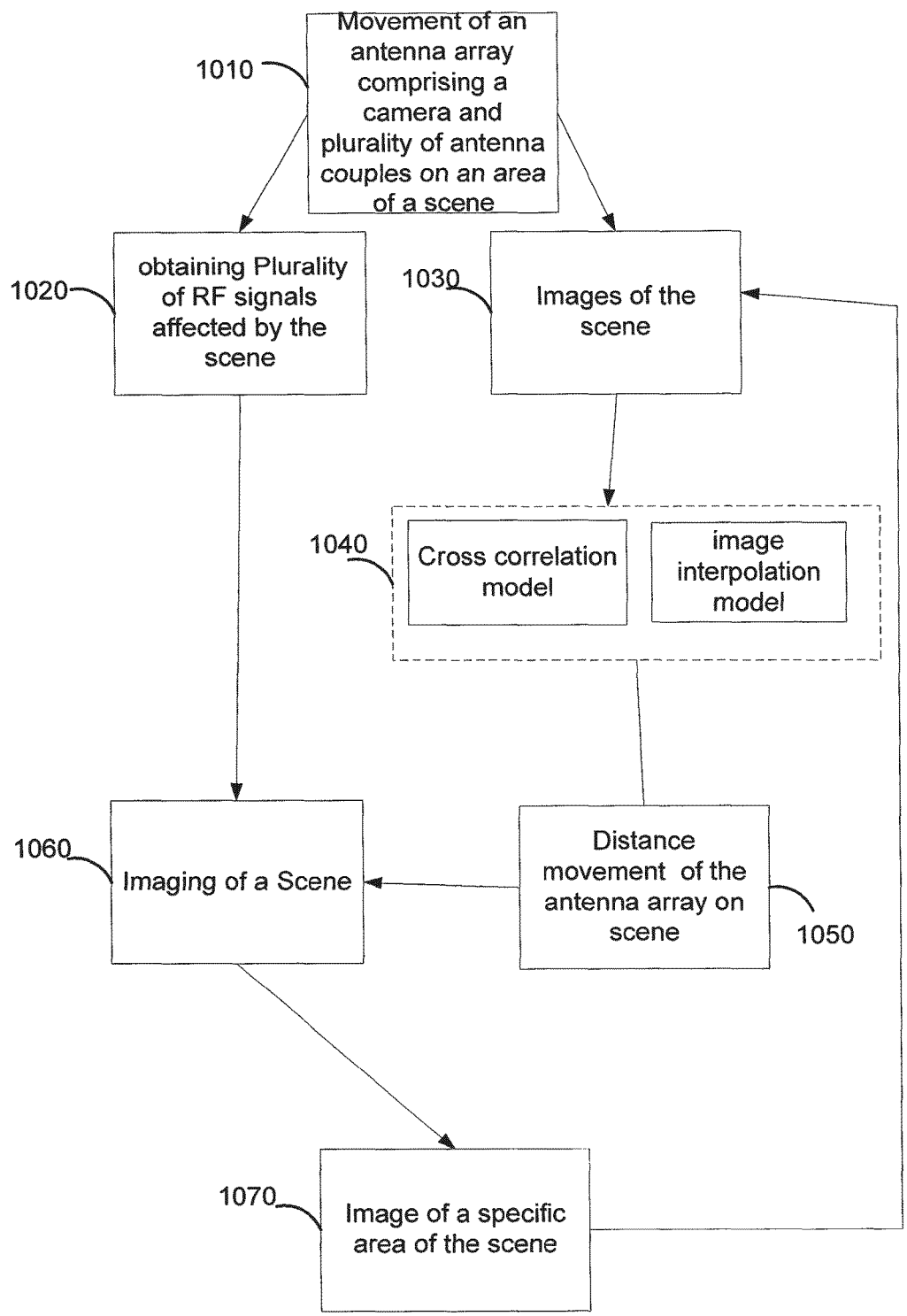
FIG. 10 shows a process flow diagram of a method measuring a movement, displacement and/or distance, and/or orientation of a device such as a mobile device comprising an array such as an antenna array and an imager, such as a camera, in respect to a reference point, in accordance with embodiments of the invention.

FIGS. 8-10 illustrate a number of alternative methods for measuring a movement, and/or distance, and/or orientation of a device such as a mobile device comprising an array such as an antenna array and/or an image unit such as a camera, in respect to a reference point, in accordance with embodiments of the invention.

FIG. 8 is a flowchart 800 of a method for measuring a movement, and/or distance, and/or orientation of a device such as a mobile device comprising an array such as an antenna array, in respect to a reference point, in accordance with embodiments of the invention. At steps 810 and 820 a device such as a mobile device including an antenna, array is moved along an object or a medium in a scene, while a plurality of signals are emitted and obtained by the array. In step 830 the signals are processed in accordance to the type of movement of the device, e.g., scanning in one dimension includes analysis based on a comparison model, while a 'free style' scan movement the signals are processed according to a interpolation model. At step 840 movement, and/or distance, and/or orientation of the device is measured. At step 850 an image of the scene and/or is constructed based on the affected signals, and at step 860 a specific area of the object may be imaged, for example once the device is in front of or in proximity to the specific area.

FIG. 9 is a flowchart 900 of a method for measuring a movement, and/or distance, and/or orientation of a device such as a mobile device comprising an image unit such as a camera (e.g. CCD or CMOS), in respect to a reference point, in accordance with embodiments of the invention. At steps 910 and 920 a device such as a mobile device including an antenna, array is moved along an object or a medium in a scene, while a plurality of images of the scene and/or obtained by the camera. In step 930 the images are processed to estimate a shift between images (e.g. cross-correlation). At steps 940-950 the movement, and/or displacement and/or distance, and/or orientation of the device is measured. At step 950 an image of the scene and/or is constructed based on the affected signals, and at step 960 a specific area of the object may be imaged, for example once the device is in front of or in proximity to the specific area.

FIG. 10 is a flowchart 1000 of a method for measuring a movement, displacement and/or distance, and/or orientation of a device such as a mobile device comprising an array such as an antenna array and an imager, such as a camera, in respect to a reference point, in accordance with embodiments of the invention. At steps 1010 a device such as a mobile device including an antenna array and an imager such as camera is shifted (e.g. scanned) along an object or a medium in a scene, while a plurality of signals are emitted and obtained by the array (1020) and a plurality of images of the scene and/or the object are imaged (1030). At step 1040 the images are processed in accordance to the type of movement of the device, e.g., scanning in one dimension includes analysis based on a comparison model, while a 'free style' scan movement the signals are processed according to a interpolation model. At step 1050 movement, and/or distance, and/or orientation of the device is measured. At step 1060 an image of the scene and/or the object and/or the inner parts of the object or the scene are constructed based on the affected signals, and the images obtained by the imager. And at step 1070 a specific area of the object may be imaged, for example once the device is in front of or in proximity to the specific area.

The methods described above are in some cases described in one or two dimensions and using only one rotation angle θ, as is the case in scanning a surface, however those of skill in the art will recognize that these methods easily extend to three dimensions and up to two angles (rotation and elevation), as applicable.

In further embodiments, the processing unit may be a digital processing device including one or more hardware central processing units (CPU) that carry out the device's functions. In still further embodiments, the digital processing device further comprises an operating system configured to perform executable instructions. In some embodiments, the digital processing device is optionally connected a computer network, hi further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis, hi some embodiments, the device is volatile memory and requires power to maintain stored information. In some embodiments, the device is non-volatile memory and retains stored information when the digital processing device is not powered, in further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device includes an input device to receive information from a user, in some embodiments, the input de vice is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In oilier embodiments, the input device is a video camera to capture motion or visual input. In still further embodiments, the input device is a combination of devices such as those disclosed herein.

In some embodiments, the system disclosed herein includes one or more non-transitory computer readable storage media encoded with a program including instructions executable by the operating system of an optionally networked digital processing device. In further embodiments, a computer readable storage medium is a tangible component of a digital processing device, in still further embodiments, a computer readable storage medium is optionally removable from a digital processing device.

In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media. In some embodiments, the system disclosed herein includes at least one computer program, or use of the same, A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

In some embodiments, a computer program includes a mobile application provided to a mobile digital processing device. In some embodiments, the mobile application is provided to a mobile digital processing device at the time it is manufactured. In oilier embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirpiaySDK, alcheMo, Appcelerator®, Celsius, Bedrock, Flash Lite, .NET Compact Framework, Rhomobile, and Worklight Mobile Platform. Other development environments are available without cost including, byway of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

In some embodiments, the system disclosed herein includes software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

In some embodiments, the system disclosed herein includes one or more databases, or use of the same. In view of the disclosure provided herein, those of skill in the art will recognize that many databases are suitable for storage and retrieval of information as described herein. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, FIGS. and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated aid described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

All publications, patents and patent applications mentioned in this specification are herein incorporated in their entirely by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A device for measuring a movement of the device relative to a reference location, the device comprising:
    an array, the array comprises at least two transducers, wherein at least one of said at least two transducers is configured to transmit a signal towards an object, and at least one transceiver attached to said at least two transducers, the at least one transceiver is configured to repetitively transmit at least one signal toward the object and receive a plurality of signals affected by the object while the array is moved in proximity to the object;
    a data acquisition unit configured to receive and store said plurality of affected signals; and
    at least one processor unit, said at least one processor unit is configured to:
    process said affected signals to yield a plurality of signal measurements and compare said signal measurements obtained at different locations over time of said device and calculate a movement of the device relative to a reference location.

2. The device of claim 1, wherein said comparing signal measurements further comprises comparing a first set of signal measurements of said plurality of signal measurements received by a first couple of transducers of said array to a second set of signal measurement of said plurality of signal measurements received by a second couple of transducers of said array and retrieve said device movement distance on said object in respect to the reference location.

3. The device of claim 2, wherein said movement comprises displacement trajectory x(t) or x(t),y(t) of said device with respect to said object.

4. The device of claim 3, wherein said plurality of signal measurements comprise a plurality of transfer functions of said array.

5. The device of claim 4, wherein each of said plurality of transfer functions comprise said object response between two transducers of said at least two transducers as function of frequency or time and wherein the at least one processor unit is configured to estimate said device movement trajectory x(t) or x(t),y(t) relative to the first reference location of said device.

6. The device of claim 5, wherein said estimation comprises:
    (a) finding a plurality of displacements delta ($\Delta=(\Delta_X,\Delta_Y)$) of said device such that there exist two ordered sets of transducers pairs in the array, a first set of transducers pairs (L) and a second set of transducers pairs (R), such that all transducers pairs in said first set of transducers pairs are shifted by one of said plurality of displacements delta ($\Delta$) compared to a respective transducers pairs in said second set of transducers pairs;

(b) comparing transfer functions taken at each location at said object to transfer functions taken at other locations using a comparison metric and producing one or more comparison matrices $D_\Delta(T_1,T_2)$ wherein each snapshot of recorded signals is compared to each other snapshot;

(c) calculate log-likelihood functions for each displacement over a plurality of combinations of $T_1,T_2,\Delta$, wherein the log-likelihood is the distance $x(T_1\text{-}x(T_2)$ between the measurements taken at times $T_1,T_2$ is $\Delta+d$ is determined as function of $D_\Delta(T_1,T_2)$;

(d) calculate a log-likelihood of each trajectory using a movement model.

7. The device of claim 6, comprising combining side information from an accelerometer, said accelerometer is in communication with said array.

8. The device of claim 7, comprising calculating the displacement trajectory x(t), or x(t) and y(t) in two dimensions from the set of at least one matrix $D_\Delta(T_1,T_2)$.

9. The device of claim 4, wherein estimating the movement trajectory of said device further comprises estimating a two dimensional location x(t),y(t) and array rotation θ(t).

10. The device of claim 4 comprising:
providing an interpolator said interpolator is configured to estimate from a first plurality of recorded transfer functions a second plurality of transfer functions, that would be obtained had the displacement and rotation changed by ΔX,ΔY,Δθ.

11. The device of claim 4, comprising:
(a) providing an estimator for shift between measurement, said estimator is configured to compare a first set of transfer functions of said transfer functions recorded at a current snapshot, to a second set of transfer functions of said transfer functions recorded at a previous snapshot, after interpolating by the change ΔX,ΔY,Δθ, and finding the displacement and rotation ΔX,ΔY,Δθ for which best fit of the first set of transfer functions and the second set of transfer functions is obtained; and
(b) providing an integrator configured to integrate the changes ΔX,ΔY,Δθ from snapshot to snapshot to obtain a complete trajectory x(t),y(t)θ(t).

12. The device of claim 6, wherein for each of said plurality of displacements delta (Δ) a matrix $D_\Delta(T_1,T_2)$ is provided, said matrix comprising for each pair of said snapshots (T1,T2) a comparison result:

$D_\Delta(T_1,T_2) = \mu(\{S_{ij}(T_1),S_{i'j'}(T_2)\}_{(i,j)\in L^{(\Delta)},(i',j')\in R^{(\Delta)}})$, where μ is a metric.

13. The device of claim 12 wherein the metric μ is:

$$\mu = \sum_{(i,j)\in L^{(\Delta)},(i',j')\in R^{(\Delta)}} \frac{\|S_{ij}(T_1) - S_{i'j'}(T_2)\|^2}{P_{ij} + P_{i'j'}}$$

where $\|S\|^2$ is L2 norm sum of squares over frequency or time domain of the signal, and $P_{ij}$ are powers of the signals, either estimated or known apriori.

14. The device of claim 13 wherein the said log-likelihood function for the displacement in step c is:

$$L(d = x(T_1) - x(T_2) - \Delta) = \left(\log(1-\rho^2) - \frac{2\rho}{1+\rho}\right) + \frac{\rho}{(1-\rho^2)}D_\Delta(T_1,T_2)$$

where $$\rho(d) = \rho_{max} \cdot \exp\left(-\left(\frac{d}{L_{coh}}\right)^2\right)$$

is an assumed spatial correlation function with parameters $\rho_{max}$ (maximum correlation) and $L_{coh}$ (coherence length).

15. The device of claim 1 wherein said array is a radio frequency (RF) antenna array and said at least two transducers are RF antennas.

16. A device for measuring a movement of the device relative to a reference location, the device comprising:
at least one imager the imager is configured to continuously image a plurality of images of an object from a constant distance;
a data acquisition unit configured to store said plurality of images and attach an index or a time stamp to each image of said plurality of images;
at least one processor unit, said at least one processing unit is configured to enhance said plurality of images and compare at least two sets of images of said plurality of images to yield an incremental displacement ΔX,ΔY and rotation Δθ between the at least two sets of images and calculate a movement of the object relative to a reference location.

17. The device of claim 16 wherein said image enhancement comprises de-trending and compensation for differences in lightning in various part of each of said plurality of images.

18. The device of claim 16 wherein said at least two sets of images are consecutive snapshots images.

19. The device of claim 16 wherein the plurality of images are high-pass filtered and cross-correlated in order to yield a shift and rotation between each image of said plurality of images.

20. The device of claim 19 wherein the first set of images are shifted and interpolated to represent a shift of ΔX,ΔY and a rotation Δθ, and compared to the second set of images by summing a product of each pixel in each image of the first set of images after shifting and the respective pixel second image to obtain a single number, and providing a cross-correlation function by repeating the computation above for each ΔX,ΔY and a rotation Δθ generates the cross-correlation function and finding for each snapshot incremental displacement ΔX,ΔY and rotation Δθ that maximize said cross-correlation function.

21. The device of claim 20 comprising providing an integrator, said integrator is configured to integrate the changes ΔX,ΔY,Δθ from snapshot to snapshot to obtain the full trajectory (t),y(t)θ(t).

22. The device of claim 20 comprising calibrating the resulting displacements x(t),y(t) by multiplying by a factor that corrects the relation between the scaling of the plurality of images and actual displacements.

23. The device of claim 16 wherein said imager is a camera.

24. The device of claim 23 wherein said device is a mobile phone and said camera is a camera of said mobile phone.

25. The device of claim 16 comprising a light source to compensate for external lighting conditions.

26. The device of claim 16 comprising:
an array, wherein said array is attached to said device, the array comprises at least two transducers, wherein at least one of said at least two transducers is configured to transmit a signal towards said object, and at least one transceiver attached to said at least two transducers, the at least one transceiver is configured to repetitively transmit at least one signal toward the object and receive a plurality of signals affected by object while the array is moved in proximity to the scanned object, and wherein the at least one processor unit is configured to process said affected signals and incremental displacement $\Delta X, \Delta Y$ and rotation $\Delta\theta$ of the device and provide an RF image of said object.

27. The device of claim 26 wherein said RF image comprises at least one image of internal elements of said object.

28. The device of claim 26 wherein said RF image is a 2D (two dimension) or 3D (three dimension) image.

* * * * *